United States Patent [19]

Künemund

[11] Patent Number: 5,764,855
[45] Date of Patent: Jun. 9, 1998

[54] METHOD FOR FUZZIFYING INPUT SIGNALS PRESENT AT THE INPUTS OF A FUZZY PROCESSOR BY USING INPUT MEMBERSHIP FUNCTIONS

[75] Inventor: Thomas Künemund, München, Germany

[73] Assignee: Siemens Aktiengesellschaft, Munich, Germany

[21] Appl. No.: 737,002

[22] PCT Filed: Apr. 6, 1995

[86] PCT No.: PCT/DE95/00469

§ 371 Date: Oct. 28, 1996

§ 102(e) Date: Oct. 28, 1996

[87] PCT Pub. No.: WO95/30185

PCT Pub. Date: Nov. 9, 1995

[30] Foreign Application Priority Data

Apr. 29, 1994 [DE] Germany .................. 44 15 183.7

[51] Int. Cl.⁶ .................................................. G06G 7/00
[52] U.S. Cl. ........................ 395/3; 395/61; 395/900
[58] Field of Search ........................ 395/3, 61, 900, 395/51

[56] References Cited

U.S. PATENT DOCUMENTS

| | | | |
|---|---|---|---|
| 5,410,633 | 4/1995 | Ota et al. | 395/3 |
| 5,566,274 | 10/1996 | Ishida et al. | 395/61 |
| 5,615,303 | 3/1997 | Abruzzese et al. | 395/3 |

FOREIGN PATENT DOCUMENTS

| | | | |
|---|---|---|---|
| 0 513 689 | 11/1992 | European Pat. Off. | G06F 7/60 |
| 0 525 670 | 2/1993 | European Pat. Off. | G06F 7/60 |
| 0 574 174 | 12/1993 | European Pat. Off. | G06F 7/48 |
| 39 36 503 | 5/1990 | Germany | G06F 15/353 |
| 42 30 756 | 11/1993 | Germany | G05B 19/05 |
| 43 08 194 | 9/1994 | Germany | G05B 13/00 |

OTHER PUBLICATIONS

Eichfeld et al., "Architecture of a CMOS Fuzzy Logic Controller with Optimized Memory Organisation and Operator Design", Proceedings of the International Conference on Fuzzy Systems, 8 Mar. 1992, San Diego, pp. 1317–1323.

Eichfeld et al., "An 8b Fuzzy Coprocessor for Fuzzy Control", 1993 IEEE International Solid–State Circuits Conference, San Francisco, pp. 180, 181, 286.

Thaler, "Neurogenerator Vereinfacht Fuzzy–Entwicklung", Design & Elektronik-Zukunftstechnologien, pp. 10–14, Sep. 1993.

*Primary Examiner*—Allen R. MacDonald
*Assistant Examiner*—Jason W. Rhodes
*Attorney, Agent, or Firm*—Hill & Simpson

[57] ABSTRACT

A fuzzy processor contains a fuzzifier which calculates from the digital input signal membership values of the input membership functions hit. The membership functions must be stored for this purpose. In order to reduce the memory requirements, in particular in conjunction with a high resolution of the input signals, it is expedient to describe the membership functions by means of shape-determining features such as restart points and slopes, and to store these features. In order to save calculating time, the definition range of the input signals is now divided into elementary intervals of equal size. During fuzzification, only that elementary interval is considered in which the input signal to be fuzzified is situated. This reduces the number of the membership functions to be considered. The result of the method is fuzzification of the input signals in conjunction with a minimum calculating time without the memory requirements for storing the membership functions becoming excessive.

14 Claims, 17 Drawing Sheets

FIG 5

| t[2..0] | INF- SHAPES | | SIGN BITS ys1/ys1 | IDM- WORDS |
|---|---|---|---|---|
| 000 | (graph: pr,qr vs xs) | (graph: pl,ql vs xs) | -/0 | SW 1) mlm[3..0]&ys[11..0]<br>SW 2) pr[3..0]&qr[11..0] |
| 001 | (graph: pl,ql vs xs) | (graph: pl,ql vs xs) | 1/- | SW 1) mlm[3..0]&ys[11..0]<br>SW 2) pl[3..0]&ql[11..0] |
| 010 | (graph: pr,qr vs xs) | (graph: pl,ql vs ys) | -/0 | SW 1) mlm[3..0]&ys[11..0]<br>SW 2) pl[3..0]&ql[11..0] |
| 011 | (graph: pl,ql vs ys) | (graph: pl,ql vs ys) | 1/0 | SW 1) mlm[3..0]&ys[11..0]<br>SW 2) pl[3..0]&ql[11..0] |

METHOD FOR FUZZIFYING INPUT SIGNALS PRESENT AT THE INPUTS OF A FUZZY PROCESSOR BY USING INPUT MEMBERSHIP FUNCTIONS

BACKGROUND OF THE INVENTION

1. Field of the Invention

The present invention relates to a fuzzy logic processor which contains a fuzzifier which calculates membership values of the input membership functions hit from the digital input signal.

2. Description of the Related Art

The structure and mode of operation of fuzzy logic processors are known (see, for example, the publication by H. Eichfeld, T. Künemund, M. Klimke "An 8b Fuzzy Coprocessor for Fuzzy Control" ISSCC 93, San Francisco, 24 to 26 Feb. 1993, pages 180, 181, 286). Such a fuzzy logic processor contains a fuzzy circuit, also termed a fuzzifier, whose task consists in using input membership functions stored in a memory—also termed a knowledge base memory (KBM)—to determine the membership values for a digital input signal which is to be fuzzified. This firstly requires a determination of which input membership functions (termed membership function below) are hit by the input signal. Subsequently, the membership values assigned to the input signal can then be fetched from the memory.

It has been customary to date to store the membership functions in a point-by-point fashion. Assuming that the input signal is resolved with 8 bits, the membership functions were stored in a pointwise fashion with 256 points. This has advantages. The calculation of the membership values is performed by means of memory access (a sampling method). Any desired shape of the function is permitted. However, the disadvantage resides in that the required storage space is an exponential function of the resolution of the input signals, with the result that in the case of a resolution with 12 bits, for example, the sampling method leads to large memory requirements.

When searching for other possibilities of storing the membership functions, in which the memory requirements turn out to be smaller, it must always be borne in mind that the outlay on calculating time for calculating the membership values must not become excessively large.

SUMMARY OF THE INVENTION

The problem on which the invention is based thus consists in specifying a fuzzification method in which the memory requirements for storing the membership functions do not become excessively large and the calculating time for calculating the membership values nevertheless remains within acceptable limits. The problem consists, furthermore, in specifying a circuit arrangement for carrying out the method.

The problem is solved by means of a method for storing input membership functions and for fuzzifying digital input signals present at the inputs of a fuzzy processor by using these input membership functions, a) in which each membership function is stored with the aid of shape information containing the shape of the respective membership function, b) in which the basic range of the input signal, resolved with ae bits, wherein ae=number of the bits, of each input is divided into elementary intervals, c) in which the shape information of a membership function contains per elementary interval the respective values of restart points, at which the slope of the membership function changes inside the elementary interval or the membership function intersects the boundaries of the elementary interval, and contains the slopes of the membership function which start from the restart points and extend in the elementary interval, d) in which the division of the basic range into elementary intervals is performed in accordance with the division condition that each membership function inside an elementary interval, has precisely one restart point, e) in which it is determined which of the membership functions present in the elementary interval are hit by the input signal, f) and in which the membership value of the input signal is determined for each membership function hit. A circuit arrangement for carrying out the method carries out the fuzzification of input signals using a latch memory connected to a bus to the memory for storing the first memory word, read out from the memory, of the sector for the membership functions, connected downstream of the latch memory is a multiplexer which selects the type number from the first memory word, a counter is provided whose output is connected to the control input of the multiplexer and a comparator circuit to which at the second input the number of membership functions per elementary interval is fed by the latch memory, a latch memory connected to the bus is provided in each case for buffering the values $\overline{xs}$, ys, p, q, and a calculating circuit is provided for calculating the membership value according to the formula:

$$ye = ys + (-1)^{vdy} . (sa.dxa)$$

in which:

ys=restart point value in the y-direction, sa=absolute value of the slope, dxa=absolute value of the difference dx=xe−xs xs=restart point value in x-direction, and vdy=sign of the difference ye−ys.

The memory requirements for storing the membership values can be reduced by virtue of the fact that shape information is stored which records the shape of the membership function. This shape information contains features which define the shape of the membership function such as, for example, restart points at which the slopes of the function change, and the slopes between the restart points.

The access time to the shape information of membership functions hit by the input signal can be reduced by dividing the basic range, dependent on the resolution, of the input signals into elementary intervals. The elementary interval can then be selected with the aid of the most significant bits (MSB) of the input signal. In this process, the memory requirements can be further reduced if the elementary intervals are selected in such a way that at most four membership functions or parts of membership functions are situated inside each elementary interval and/or, as a division condition, each part, situated inside an elementary interval, of a membership function can be described by precisely one restart point and slopes to the right and to the left starting from this restart point. However, since restart points can also be present at the interval boundaries, it must be that in addition to possibly two restart points at the interval boundaries a third restart point inside the elementary interval suffices for a unique description of the membership function inside this elementary interval. The membership functions can be polygons of any desired shape in this case.

The subdivision can be performed into elementary intervals which are respectively of equal size, the subdivision being such that there is no elementary interval which does not fulfill the division condition. However, for the purpose of saving storage space it is possible to subdivide the basic range sequentially into elementary intervals of different size, it being the case that only those intervals obtained after a preceding subdivision are further subdivided which do not fulfill the division condition. The intervals which fulfill the division condition, by contrast, remain unchanged and form an elementary interval.

The memory requirements for storing the shape information of the membership functions can be further reduced if the shape information contains the following:

a number of the membership function, the restart point values in the x-direction and in the y-direction, and slope information.

The slope information can comprise two parts in this case, in which the first part specifies the bit position of the leading '1' in front of the decimal point of the absolute value of the slope, or specifies that all the positions in front of the decimal point are '0', and in which the second part is obtained from the bit following the leading '1' in front of the decimal point or, if there is no leading '1' in front of the decimal point, is determined from the positions after the decimal point of the absolute value.

It is expedient, furthermore, for the different shapes of the membership functions inside an elementary interval to be assigned a type number in such a way that the most significant bits of the type number specify whether inside the elementary interval the partial curve of the membership function which start from the restart point has only one slope or two different slopes, and in which two further bits specify the sign of the slopes.

This shape information is stored in a memory, the knowledge base memory, sequentially for each elementary interval and for each input in such a way that it can be addressed very quickly via three memory words. In this case, a first memory word contains the address of a second memory word in which the number of the elementary intervals is stored for each input in a coded fashion. With the aid of this information and the most significant bits of the input signal, a third memory word is addressed in which the start address of a memory sector with the membership functions is contained, specifically per input and per elementary interval.

Other developments of the invention provide a method as described above, in which the number of the membership functions per elementary interval is at most four.

The method may provide that the selection of an elementary interval is performed with the aid of the aei most significant bits (aei=number of the bits) of the input signal.

The method is particularly effective when:

a) the basic range is subdivided into intervals of equal size until at least one of the intervals fulfills the division condition, this interval then remaining unchanged and forming an elementary interval(the elementary interval of first stage), b) the intervals which do not fulfill the division condition after the first subdivision are respectively further subdivided independently of one another until at least one of these intervals of the second stage fulfills the division condition, this interval then remaining unchanged and forming an elementary interval (elementary interval of second stage), c) in which for the intervals which do not fulfill the division condition after a preceding subdivision further subdivision is performed in accordance with step b) until the intervals produced in the process respectively fulfill the division condition, the intervals which satisfy the division condition respectively remaining unchanged and forming an elementary interval (elementary interval of higher stage).

In preferred embodiments, the elementary intervals are of equal size. Specifically, the number of elementary intervals is a power of 2, and aei most significant bits of the input signal fix the basic range form the exponent.

In one embodiment, the stored shape information contains for each membership function a number, the restart point values and slope information. In this case, the slope information comprises two parts, in which the first part b specifies the bit position of the leading '1' in front of the decimal point of the absolute value of the slope sa, or specifies that all the positions in front of the decimal point are '0', and in which the second part q is obtained from the bit following the leading '1' in front of the decimal point or, if there is no leading '1' in front of the decimal point, is determined from the positions after the decimal point of the absolute value sa. The different shapes of the membership functions are respectively assigned a type number, in which one bit of the type number specifies whether the partial curve of the membership function which starts from the restart point has only one slope or two different slopes inside the elementary interval, and in which two further bits of the type number specify the sign of the slopes. The shape information of the membership function is stored per input in a memory and addressed in the following way:

in a first memory word a first address is stored with which it is possible to address a second memory word in which the number of elementary intervals per input for all the inputs is stored in a coded fashion, and for each elementary interval, a third memory word is stored per input in which the start address of that memory sector is contained which contains the shape information of the membership functions per elementary interval and input, and which third memory word is addressed by combining aei most significant bits of the input signal and number.

As a variation thereof, the method provides that the shape information of the membership function is stored per input in a memory and addressed in the following way:

a) there is stored in a first memory word a first address with which a second memory word can be addressed in which the number of intervals of the first stage is stored in a coded fashion, b) with the aid of the content of the second memory word and the most significant bits of the input signal a third memory word is addressed in which at least one position specifies whether the interval of the first stage fixed by the most significant bits of the input signal is an elementary interval, ba) in this case, the start address of the memory sector is taken from the further positions of the third memory word by storing the shape information of the membership functions of the elementary interval hit, bb) otherwise the most significant bits of the input signal are used to address a further memory word in which at least one position specifies whether the interval, hit by the most significant bit, of the second stage is an elementary interval, and in this case there is taken from the further positions of the further memory word the start address of that memory sector in which the shape information of the membership functions of the elementary interval hit is stored, otherwise the procedure is continued as in bb) until it can be detected from the further addressed memory words that the interval hit by the most significant bit is an elementary interval and the assigned memory sector is found.

In particular, the memory sector for the membership functions for each elementary interval contains the following information:

in a first memory word, the number of the membership functions per elementary interval and the type numbers of the membership functions in this elementary interval are stored, and the numbers of the membership functions, the restart point values and the slope information are stored in further memory words.

The circuit arrangement as described above is particularly defined wherein the calculating circuit has the following circuits:

a first switching network for forming the difference dx, a second switching network for forming the absolute value dxa, which is connected to the first switching network, a multiplier for generating the product sxa from the absolute value of the slope sa and the absolute value of the difference dxa, and an adder for adding the product sxa to the restart value ys to form the result ye. In addition, the circuit arrangement includes a third switching network which is connected downstream of a multiplier and which shifts the product sxa in accordance with value p to the correct position, and a fifth multiplexer is provided which applies the shifted product sxa as the difference dy to the adder.

A rounding bit obtained from the positions after the decimal point of the product sxa shifted to the correct position by means of the third switching network is used to carry out the rounding of the difference dy as a function of the sign of the difference vdy in the fifth multiplexer.

The third switching network may be used to calculate the value of 2p·dxa and feed it to the adder via the fifth multiplexer, in which a register is provided in which the result of the adder is buffered, and a multiplexer is provided which can apply the output of the register, on the one hand, and the value ys, on the other hand, to an input of the adder.

The fourth switching network is provided which combines the value p with the absolute value of the difference dxa in order to determine whether an overflow is present.

The first switching network has a circuit for forming the one's complement of xs and a second adder, which is connected as a subtractor and forms the difference dx=xe−xs from the input signal xe, the restart point value xs and the type number.

The circuit arrangement has the fifth switching network which is fed the type number, the sign of dx and the slope information p and q, and which outputs therefrom the sign vdy of the difference dy, the slope sa, the value of p and a signal which indicates that the value of ye must be 0.

BRIEF DESCRIPTION OF THE DRAWINGS

The invention is explained in more detail with the aid of exemplary embodiments which are represented in, the figures, in which.

DETAILED DESCRIPTION OF THE PREFERRED EMBODIMENTS

Figure 1:
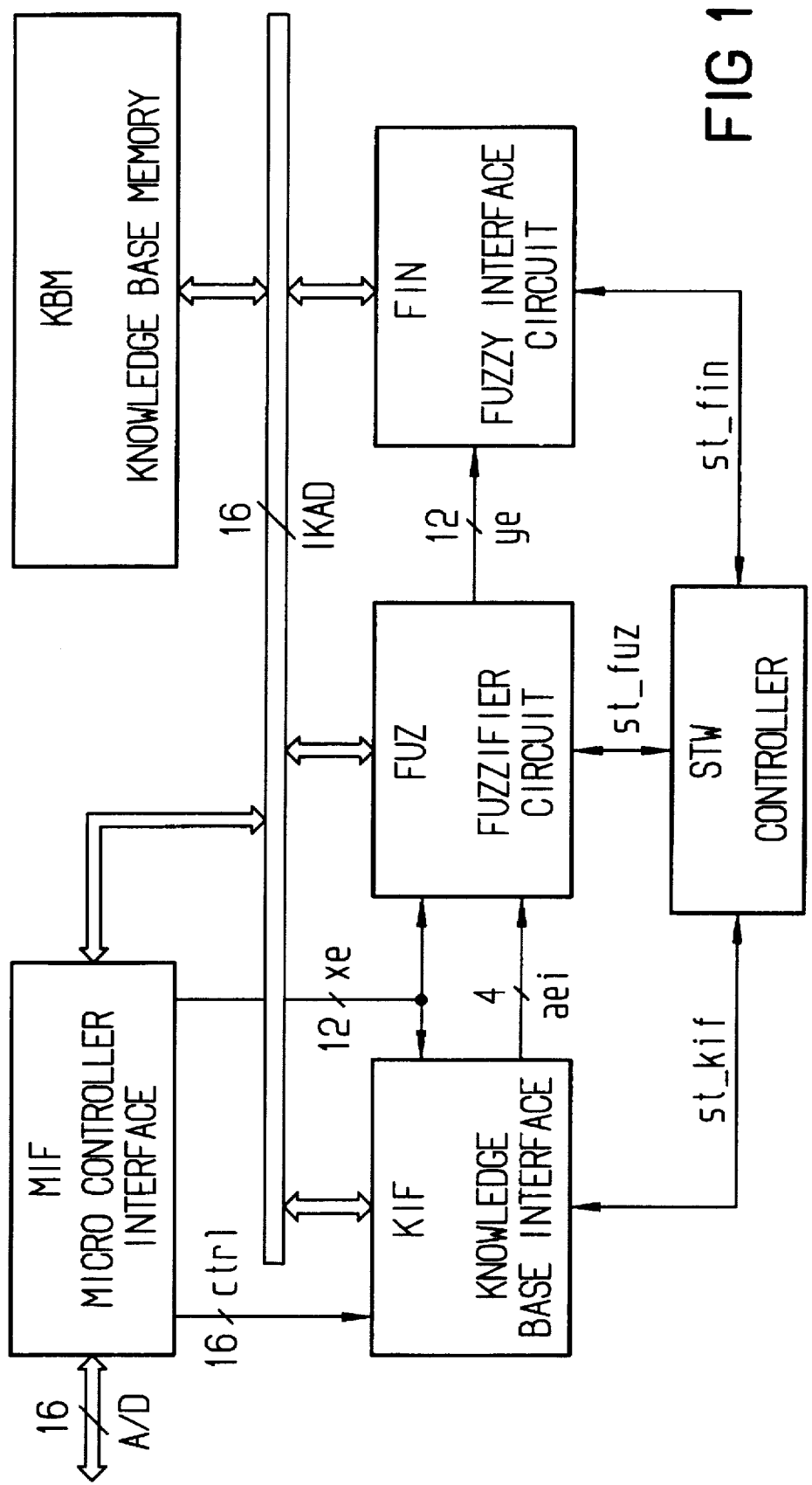
FIG. 1 is a block diagram which shows a block diagram of a fuzzy processor.

FIG. 1 shows a block diagram of a fuzzy logic processor. The fuzzy processor contains a fuzzifier circuit FUZ in which the membership values ye for so-called sharp input signals xe are formed. For this purpose, the fuzzifier circuit FUZ operates together with the memory KBM, in which the membership functions are stored. The membership value ye is relayed to the fuzzy inference circuit FIN and further processed there in a known way. Furthermore, the operation of the fuzzifier circuit FUZ requires a controller STW, a microcontroller interface MIF which produces a connection to a host computer, a knowledge base memory interface KIF which is required to operate the knowledge base memory KBM. Apart from the controller, the individual units of the fuzzy processor are connected to one another via a common bus IKAD.

In order to fuzzify input signals xe which are supplied to the microcontroller interface MIF by the host computer, use is made of the fuzzifier circuit FUZ, which determines which membership functions which are stored in the memory KBM are hit by the input signal xe and derives the membership values ye therefrom and relays these values to the fuzzy inference circuit FIN. The aim below is to outline this fuzzifier circuit and the way in which the membership functions are stored in the memory KBM; the further components of the fuzzy processor such as MIF, KIF and STW are included in the explanation only to the extent that they are required to understand the operation of the fuzzifier circuit FUZ.

In representing the invention, it is assumed that the digital input signal xe is resolved with ae=12 bits. The same holds for the membership values ye, which are likewise resolved with 12 bits. Furthermore, it is assumed in the representation that a maximum of 15 different membership functions are permitted per input and that words 16 bits wide are available in the memory.

The invention is not, of course, limited to this exemplary embodiment with these boundary conditions; this limitation is selected only in order to be able to represent the invention more clearly.

Figure 2:
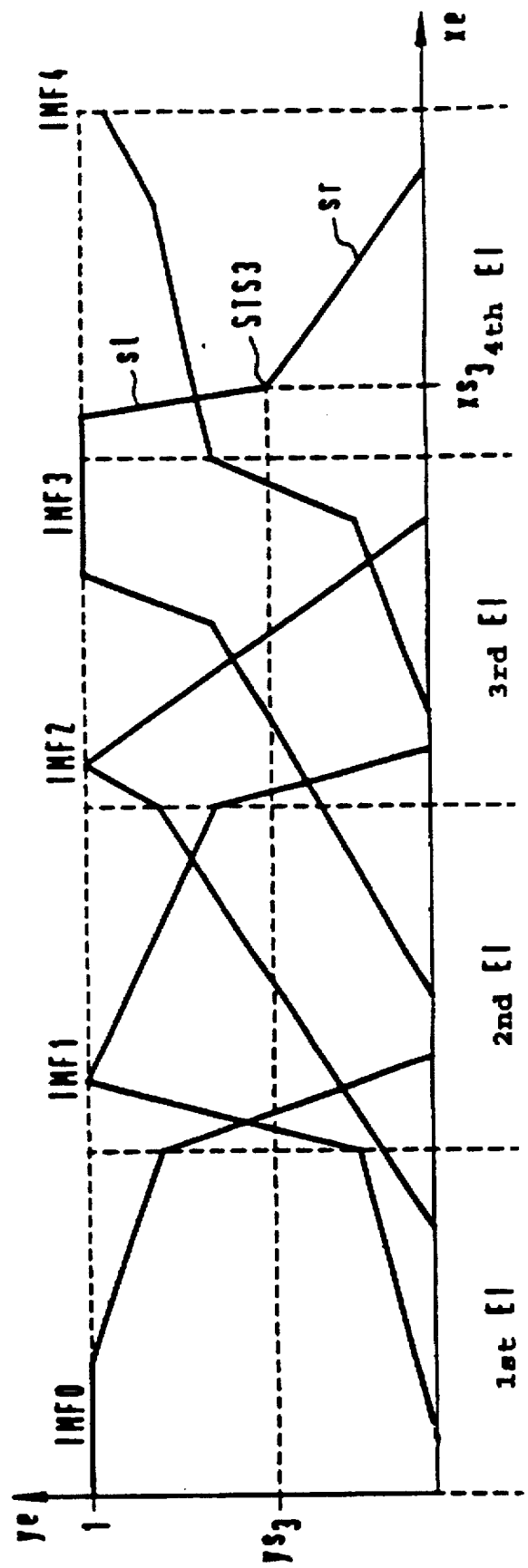
FIG. 2 is a graph which shows the representation of the basic range of an input signal and the division of the former into elementary intervals.

FIG. 2 shows the division of the basic range for the input signals resolved with ae bits. Here, FIG. 2 shows the membership functions IMF, plotted against xe, specifically in each case the membership values ye. The maximum value ye of the membership functions is standardized to 1. It is shown how the basic range of the input signal xe is divided into four elementary intervals EI, the division being such that inside each elementary interval EI there are situated at most four membership functions and each part, situated inside an elementary interval, of a membership function can be described precisely by a restart point STS and the slopes to the right and to the left of the restart point STS. FIG. 2 specifies a restart point which is marked by xs3 and xs3. The individual membership functions are numbered sequentially from IMF0 to IMF4. It is pointed out that in addition to this restart point it is possible for further restart points to be present inside an elementary interval at the interval boundary of an elementary interval EI. Thus, each membership function can be uniquely described per elementary interval by at most three restart points. Partial curves which have a different slope start from the restart point STS3. In this regard, in the following the slope of the partial curve to the left of the restart point STS3 is denoted by s1, and the slope of the partial curve to the right of the restart point is denoted by sr. A change in this slope occurs at the restart point itself.

The division of the basic range for the input signal xe, that is the value range which can be assumed by the input signal xe, into elementary intervals EI is performed in the following way:

Of the ae bits of the resolved input signal xe, aei most significant bits are used for the determination. It holds in this case for the flexible number of this elementary intervals that:

$$nei = 2^{aei}, \quad 0 \leq aei \leq ae-1$$

nei representing the number of the elementary intervals per input. The membership values ye are standardized in FIG. 2 to 1, but ye can assume values of between 0 and $2^{12-1}$ in the case of a resolution with 12 bits.

The elementary intervals are obtained in the following way in a second example:

The basic range of the membership functions of an input signal is subdivided in a first step into intervals of equal size (of which the number is a power of 2), until at least one of these intervals fulfills the division conditions for an elementary interval (by contrast thereto, all the intervals in FIG. 2 must fulfill this condition). The address descriptors and data of the membership functions can then be determined for these elementary intervals of stage I, and can be stored in the memory KBM.

The second stage now consists in that all the remaining intervals of stage I—that is to say those which do not fulfill the conditions for an elementary interval, and only those— are further subdivided independently of one another in each case, specifically precisely as in stage I. In other words, in stage II each of the remaining intervals of stage I is treated precisely as the basic range in stage I: the address descriptors and data of the membership functions are then determined for the elementary intervals of stage II, and all the remaining intervals of stage II are further subdivided independently of one another in stage III, as described above. The same holds for all further stages which may further be required.

Figure 16:
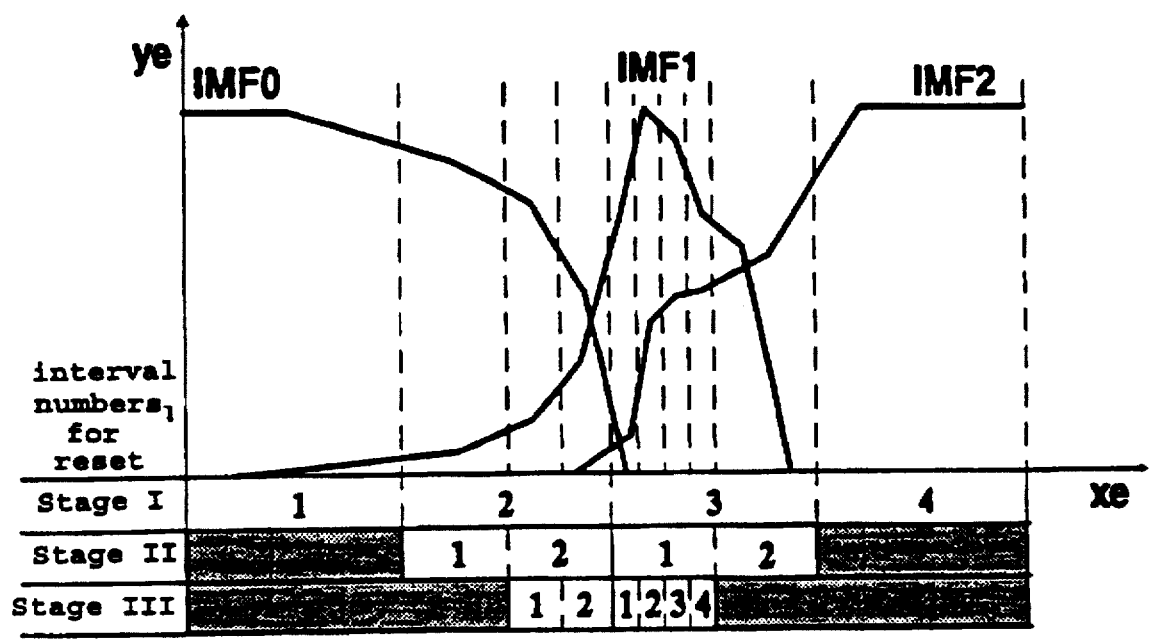
FIG. 16 is a graph which shows a second example of the division of the basic range into elementary intervals.

An example is given in FIG. 16. Stage I consists in the subdivision of the basic range of three membership functions IMF0, IMF1 and IMF2 into four intervals, the first and the fourth interval fulfilling the conditions for an elementary interval.

The second interval of stage I is further subdivided into two intervals of stage II, whose first is an elementary interval of stage II and whose second is subdivided into two further intervals of stage III, which are both elementary intervals.

The third interval of stage I is subdivided into two intervals whose second is an elementary interval of stage II and whose first is subdivided into four further intervals of stage III, which are all elementary intervals.

The result of this example is thus two elementary intervals of stage I, two of stage II and six of stage III. The data for the membership functions must therefore be stored for 10 elementary intervals.

By contrast with the subdivision of the basic range into elementary intervals of equal size, the advantage of this multistage elementary interval method consists in that the basic range now only needs to be more finely subdivided wherever the structure, that is to say restart points of the membership functions which situated closely adjacent to one another, also requires this. Owing to the fact that ranges having "little structure" can now be subdivided more coarsely, a substantial saving in storage space results—at least for cases in which the structure varies over the basic range. The additional outlay on calculating time can be limited by an expanded memory organization (see below).

The membership functions IMF are now stored in the memory KBM. It is thus necessary to determine for each input signal the membership functions IMF hit by the input signal xe, and then to calculate the membership values. This requires accessing the memory KBM. Outlined below are the memory organization and the determination of the elementary interval hit and of the memory sector in which the membership functions of the elementary interval hit are situated.

It is assumed in this case that w knowledge bases are stored in the memory KBM, and that i inputs and k elementary intervals EI are present. The respective ranges for i, k follow from FIG. 3.

As customary, the address descriptors KBD0 and KBD1 are firstly read out from the KBM and written into the memory interface KIF. An address of the so-called elementary interval address descriptor EAD is present in the address descriptor KBD 1. The elementary interval address descriptor EAD can be driven via this address. Stored in a coded fashion with in each case, for example, four bits, in the elementary interval address descriptor EAD is the exponent aei from which the number of the elementary intervals per input can be calculated. It holds that:

$$nei.i = 2^{aei.i}, \quad 0 \leq aei.i \leq 11$$

The aei stored in EAD and the aei most significant bits of the input signal xe are then used in accordance with $$adr(EIA) = adr(EAD) + \sum_{h=1}^{i-1} nei.h + rad(EIA) + \text{``0000000000000001''}$$

to determine the address of a memory word EIA in which per input and per elementary interval EI the start address of that memory sector is specified in which the membership functions assigned to an elementary interval are stored. This memory sector is denoted by IMFD. rad(EIA) is a relative address which is fixed by aei.i and the aei most significant bits of xe.i.

Figure 3:
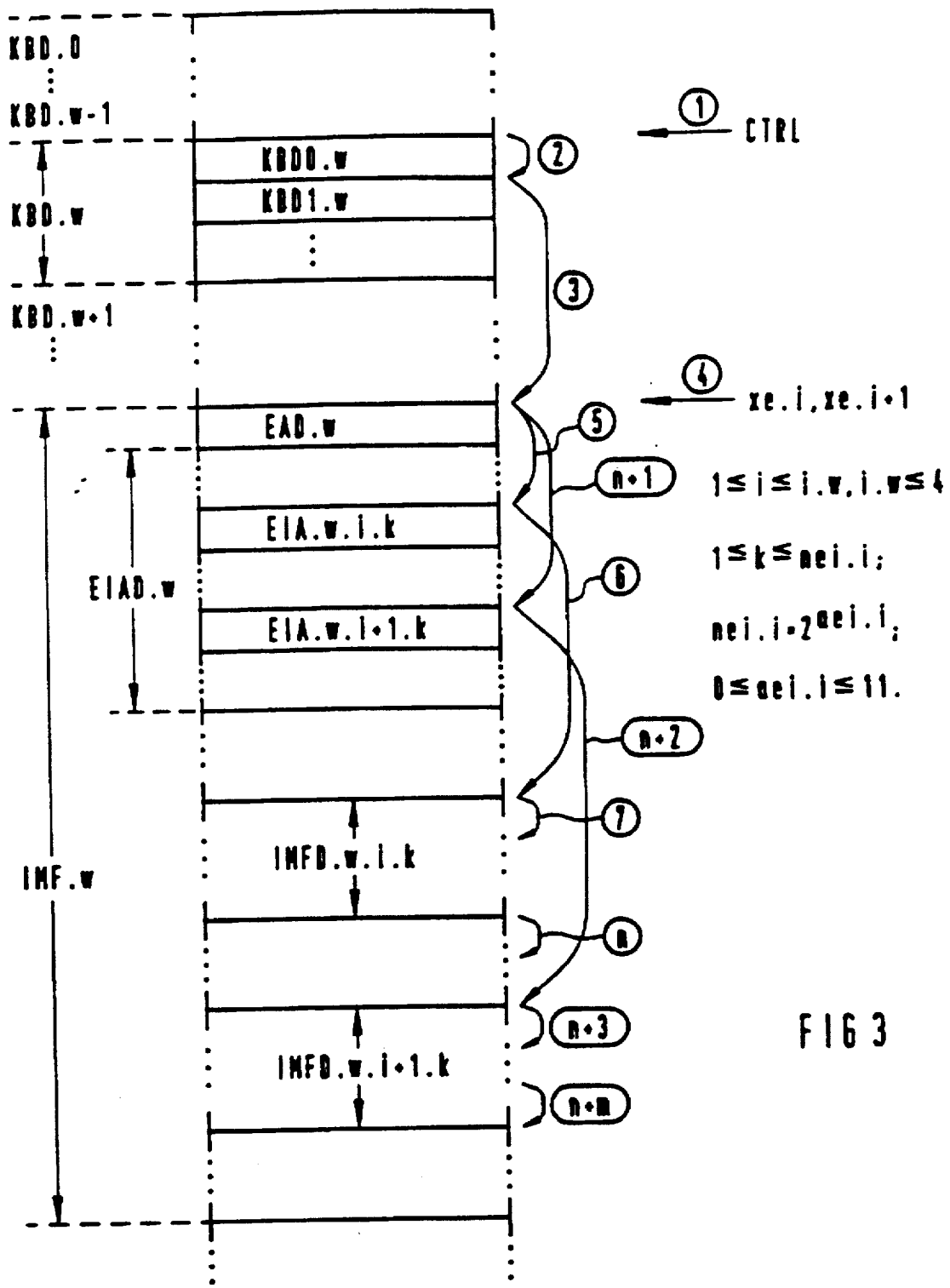
FIG. 3 is a memory chart which shows a representation of the memory organization of the knowledge base memory (KBM)

FIG. 3 yields this memory organization with the individual memory areas as well as the way in which these memory areas are addressed. There is here, firstly, a memory area for the memory words KBD per knowledge base, following which is the elementary interval address descriptor EAD per knowledge base, subsequently the memory words EIA which respectively contain the start address of the memory sector IMFD per elementary interval and per input, and finally the memory sectors IMFD for the membership functions in which the shape information per membership function is contained. The contents of these memory sectors IMFD are explained further below.

Figure 4:
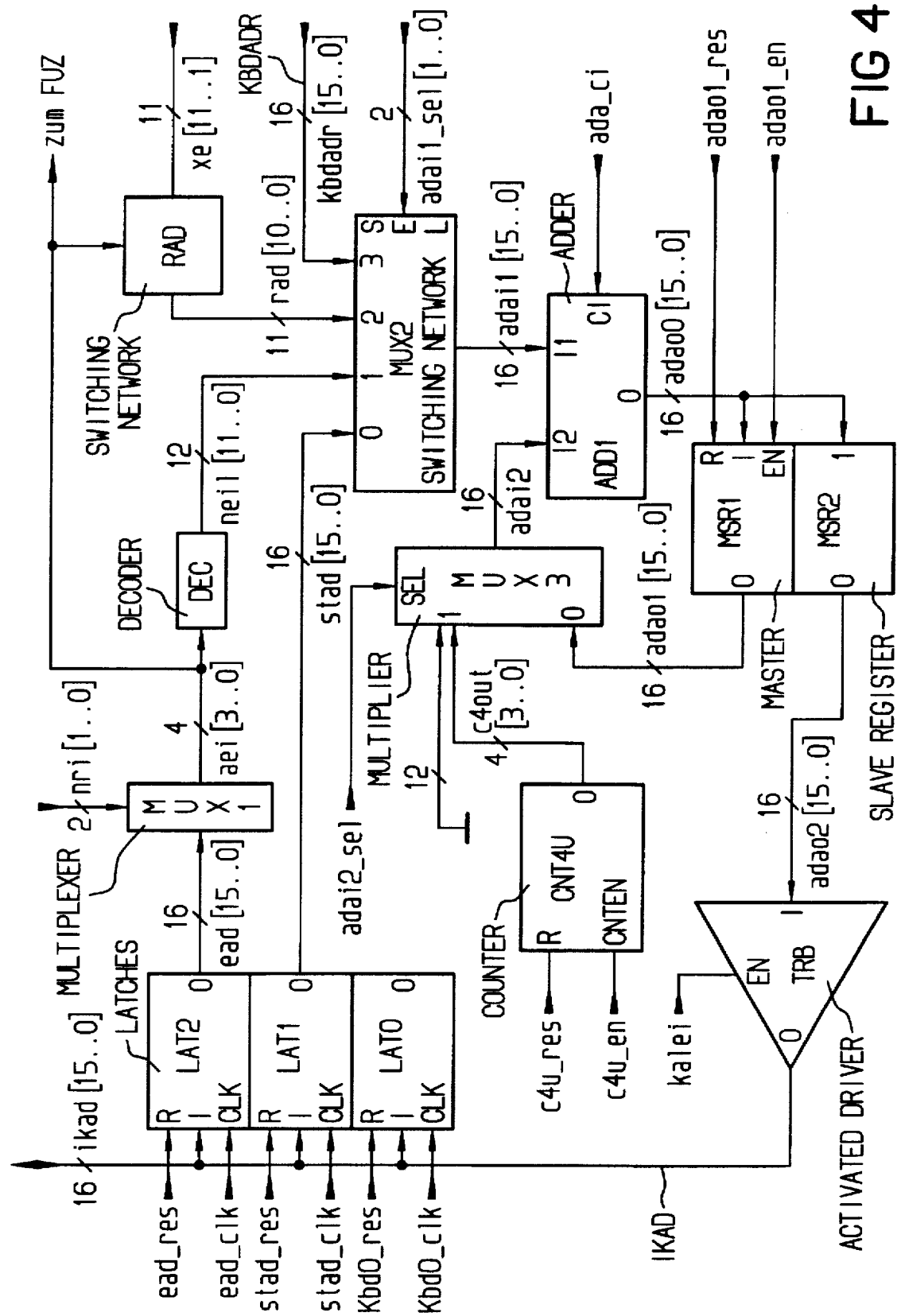
FIG. 4 is a circuit arrangement for address generation, which is suitable for addressing the memories in accordance with FIG. 3, FIGS. 5 and 6 are tables which show shapes of the membership functions, type numbers thereof, signs thereof and the memory words to be stored in the KBM.

A circuit arrangement by means of which it is possible to address this memory area is shown in FIG. 4. This circuit is contained in the knowledge base interface KIF. The specified control signals are supplied either directly by the controller, or the controller causes them to be generated in the knowledge base interface KIF. The sequence of the address generation is explained in the following in a stepwise fashion. In this case, the width of the individual signals is specified in FIG. 4:

1. Firstly, the addresses of KBD0 and KBD1, (see FIG. 3) which are generated in the KIF, specifically via a control register CTRL, and are respectively present at the address bus KBDADR (see FIG. 4) are connected with the control signal adai1_sel to an input I1 of an adder ADD1. The second input I2 of the latter is connected by means of the control signal adai2_sel to a counter CNT4U which is reset at this instant. Furthermore, it holds that ada_ci='0' for the carry input of the adder ADD1. As a result, the values of the address bus KBDADR pass unchanged via a master-slave register MSR2 and an activated driver TRB onto the bus IKAD.

2. The read-out word of KBD0 is written into the latch LAT0 opened with the signal kbd0_clk at the corresponding instant.

3. The read-out word of KBD1, equal to the address of the elementary interval address EAD, is then applied to the input I1 of the adder ADD1 via the latch LAT1, opened at the correct time with the signal stad_clk, and the switching network MUX2 driven by the signal adai1_sel; the input I2 continues to be situated at zero, and it holds that ada_ci='0'. As a result, the address of EAD passes into the master-slave register MSR1, opened at this instant with adao1_en, and onto the bus IKAD via the master-slave register MSR2 and the driver TRB in the following clock pulse.

4. In the following clock pulse, the contents of EAD are also available on the bus IKAD and are written with the signal ead_clk into the latch LAT2. From this, a multiplexer MUX1 selects with the signal aei the value, assigned to the respective input, of aei by means of which, on the one hand, the value of nei is produced via the decoder DEC and by means of which, on the other hand, there is formed from aei and xe in the switching network RAD a relative address which is used in order to determine the elementary interval, addressed by the most significant bits of the input signal xe, and the memory word EIA, assigned to this elementary interval, in the memory KBM. In order to form the address of EIA, the multiplexer MUX2 uses the control signal adai1_sel to apply to the input I1 the value, supplemented by five leading zeros, of the relative address, and the multiplexer MUX3 uses the control signal adai2_sel to apply to the input I2 of the adder ADD1 the value, stored in the register MSR1, of the address of EAD. Furthermore, it then holds that ada_ci='1'. The value thus formed of the address of EIA passes via the register MSR2 and the driver TRB onto the bus IKAD in the following clock pulse.

5. The read-out value of EIA, that is to say the address stad of the first word in the memory sector IMFD, is written with the control signal stad_clk into the latch LAT1 and applied to the input I1 of the adder ADD1 by means of the control signal ada1_sel via the multiplexer MUX2. The second input I2 of this adder receives the value '0' with the control signal adai2_sel, and it holds that ada_ci='0'. Thus, stad passes unchanged via the register MSR2 and the driver TRB onto the bus IKAD in the following clock pulse.

6. The addresses for the following maximum of sixteen accesses, still to be performed, onto the membership functions IMFD are produced by analogy with 5: Firstly, for the first fifteen accesses as the sum of the stad situated at the output of the latch LAT1 and the content, respectively increased by 1, of the counter CNT4U as well as ada_ci='0' and, finally, if a sixteen access is required, from the sum of stad and the last counter content as well as ada ci='1'.

7. During the fuzzy inference following the fuzzification of an input variable, that is to say the evaluation of the fuzzy rules, the value stored in the register MSR1 is continuously updated, that is to say the old value $$adr(EIA) + \sum_{h=1}^{i-1} nei.h$$

is applied via MUX3 to the input I2 of ADD1, and the value of nei.i, respectively supplemented by four leading '0', is applied via MUX2 to the input I1.

In the second example of FIG. 16, the calculating time can be limited to one memory access per stage by means of an expanded memory organization for the purpose of a hierarchical system of elementary interval address descriptors, since the actual calculation of the function values of the input membership functions is carried out only for the elementary interval respectively finally hit by the sharp input signal xe.

Figure 17:
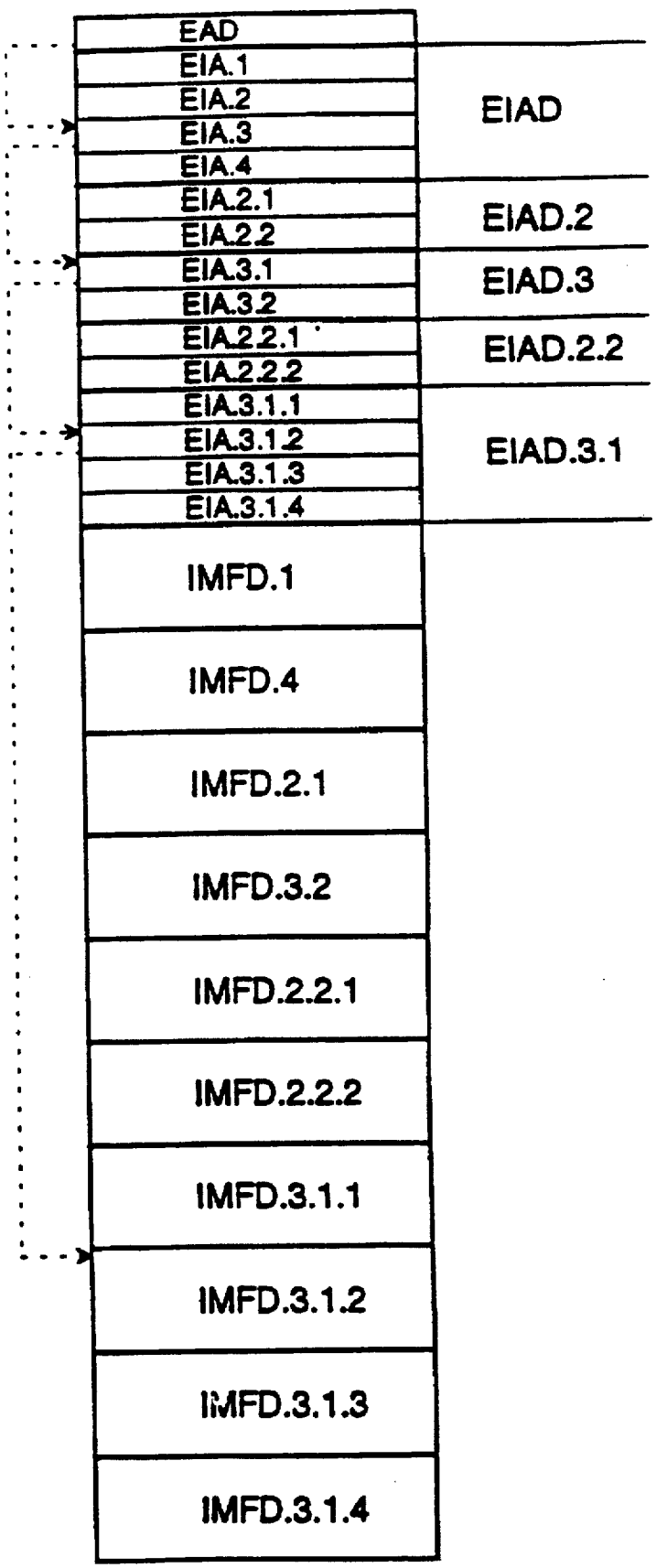
FIG. 17 is a memory chart which shows the memory organization of the KBM for the example of FIG. 16.

An example of the hierarchical system, which has just been mentioned, of elementary interval address descriptors is now to be explained by means of FIG. 17 (see also FIG. 3 in this regard). It may be assumed for this that all the memory words are 16 bits wide. As in FIG. 3, the memory word EAD with the address adr (EAD) contains the information aei on the number of the intervals of stage I into which the basic range was subdivided. aei and the sharp value xe of the input signal then yield the relative address r(aei, xe) for the address descriptor EIA.k of the kth interval, hit by xe, of stage I. It holds for the absolute address adr(EIA.k) of this descriptor that $$adr(EIA.k)=adr(EAD)+r(aei,xe)$$

By contrast with FIG. 3, the memory words EIA.k=EIA.k [15:0] are now of changed significance, however:

for EIA.k[15]=0, no further subdivision is performed, that is to say the present kth interval of stage I is an elementary interval, and the bits EIA.k[14:0] signify the start address for the memory sector IMFD.k in which the actual data of the membership functions inside this elementary interval are stored.

for EIA.k[15]=1, however, the bits EIA.k[14:13] signify the binary value of the exponent aei.k of the number nei.k=$2^{aei.k+1}$ of, for this example, a maximum of 16 intervals into which the kth interval of stage I is further subdivided. The bits EIA.k[12:0] now form a relative address for the first word of an additional block EIAD.k (corresponding to the elementary interval address descriptor block EIAD of stage I) of elementary interval address descriptors of stage II with respect to the kth interval of stage I.

In a fashion similar to the procedure specified in FIG. 3, aei, aei.k and the aei+aei.k+1MSB of xe can be used to determine which 1th interval of stage II can be hit by the sharp value xe of the input signal. The relative address r(aei, aei.k, xe) for the memory word EIA.k.1 is thus then also fixed inside EIAD.k.

The memory words EIA.k.1 and all further hierarchy stages are defined precisely in the same way as EIA.k.

This memory organization is specified in FIG. 17 for the example of FIG. 16. The sequence of the memory accesses is indicated by the dashed lines, a sharp value xe of the input signal having been assumed inside the second elementary interval of stage III. Since this elementary interval is situated in the first interval, belonging to the third interval of stage I, of stage II, the memory access to EAD is therefore followed firstly by memory access to EIA.3 and then goes to EIA.3.1 as well as EIA.3.1.2, whose 15 LSB EIA.3.1.2 [14:0] signify the start address of IMFD.3.1.2.

Figure 18:
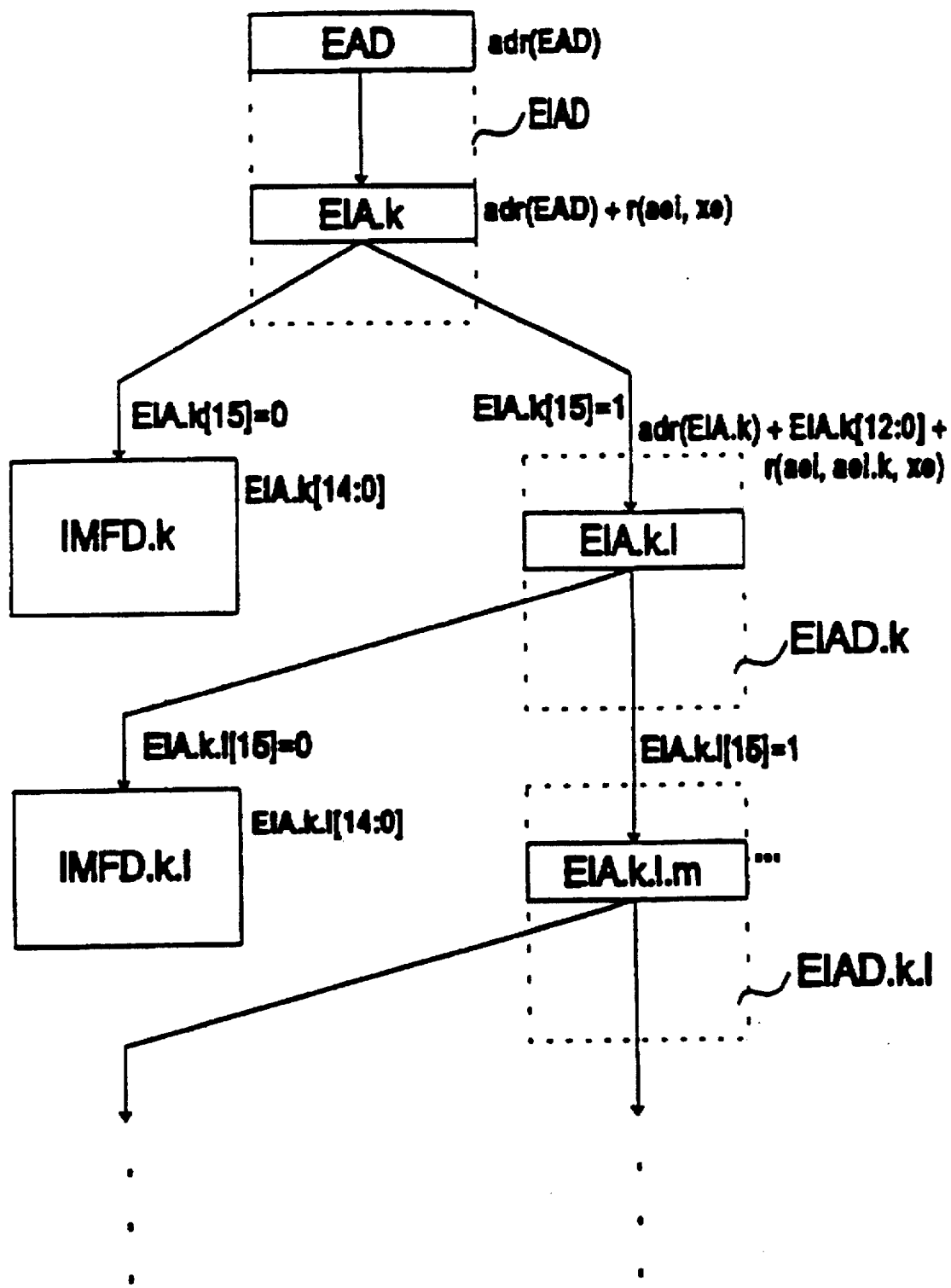
FIG. 18 is a flow chart which shows an algorithm for addressing the membership functions for the case of FIG. 17.

The algorithm used in addressing can also be gathered from FIG. 18. The arrangement for the single-stage method specified in FIG. 4 is to be expanded in order to implement the address regeneration for the multistage method in terms of circuitry.

Only the steps 4)–6) and, if appropriate, 7) need be run through for the fuzzification of the further input variables.

Figure 6:
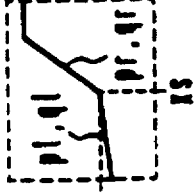

The data for the membership functions of the individual elementary intervals EI per input for the individual knowledge bases are present in the memory sector IMFD. In this arrangement, the first memory word of IMFD contains the number ZIMF, coded with two bits, of the membership functions inside an elementary interval as well as so-called type numbers t, respectively coded with three bits, for the maximum of four membership functions IMF in the elementary interval EI. The IMF shapes assigned to the type numbers are represented in FIGS. 5 and 6. The membership values ye can then be calculated for each xe with the aid of this information.

FIGS. 5 and 6 show the individual shapes of the membership functions, their type numbers and the memory words, to be stored in the memory sector IMFD, for describing the IMF shapes. The shape of the curve inside an elementary interval is shown in each case. The type numbers are selected such that the signs of the slope s are already contained in them, while the most significant bit of t specifies whether two partial curves of a different slope, which are to be stored, respectively start from the restart point STS. Such a selection of type numbers reduces the memory requirements, since there is already contained in the type number information which can be used later in calculating the membership value.

The IMF shapes for which the most significant bit is '0' are represented in FIG. 5. It is to be seen that the restart points STS are respectively fixed either by an xs or by a ys. The other value is either '0' in the case of ys, or is fixed by the boundaries of the elementary interval which can, after all, be detected with the most significant bits of the input signal xe. As shown by a comparison of the columns for the sign bits with the positions 0 and 1 of the type number t, the positions 0 and 1 of the type number t contain the sign bits. The IMF shapes are stored, with the aid of two memory words SW, in the case of the type numbers for which the most significant bit is '0'. Present in the first memory word SW1 is the number nimf of the membership function and the value of the restart point, that is to say $\overline{xs}$ or ys; present in the second memory word SW2 is data-compressed slope information DKS comprising two parts p and q, which are explained below. In the case of the IMF shapes according to FIG. 5, there is thus a need for only two memory words for storing the IMF data per elementary interval, since the further words for ys or xs, or for p or q are fixed by the shape of the curve.

The situation is different for the shapes of the curves in FIG. 6. Here, the most significant bit of thus type number is a '1'. Four memory words SW are required in order to store the IMF shape. The first memory word SW1 contains the number nimf of the membership function and the value xs of the restart point in bitwise inverted form $\overline{xs}$, the second memory word SW2 contains the values for pr and qr, the third memory word SW3 contains the values for p1 and q1, and the fourth memory word SW4 contains the value for ys of the restart point. Here, the shapes of the curves are such that the restart point is situated inside the elementary interval EI, and thus has a value xs and ys that is to be stored. Consequently, also starting from this restart point STS on both sides are curves whose slope information DKS must be stored in order to be able to calculate the membership value from these data. In this case, the sign bits, which are shown in the column of the sign bits of FIGS. 5 and 6, are not, of course, also stored, since they are contained in the type number t. The numbers specified behind the individual values specify the bit positions of the respective value, it being assumed that the values for the restart point are resolved with twelve bits and a memory word has 16 bits.

Figure 7:
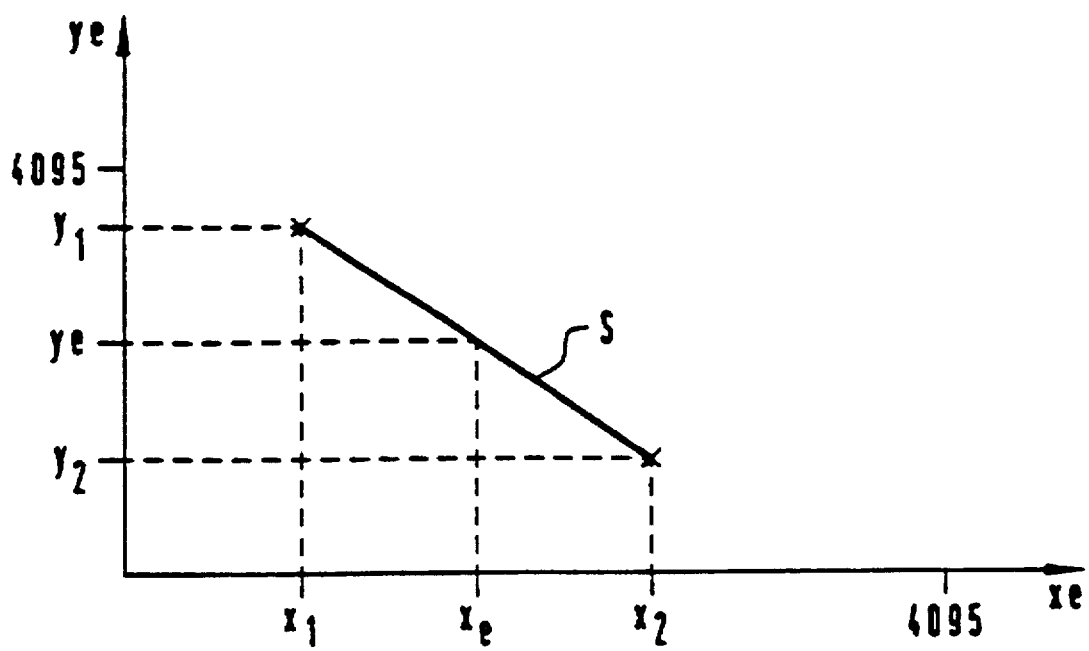
FIG. 7 is a diagram for explaining the slope information.

The data-compressed slope information is formed in the following way (FIG. 7):

The starting point is the absolute value sa of the slope s between the neighbouring restart points $(x_1, y_1)$ and $(x_2, y_2)$:

$$sa = |s| = \left| \frac{y_2 - y_1}{x_2 - x_1} \right|$$

Since the x- and y-values are resolved with 12 bits, the result for sa is a positive binary number with 12 positions in front of the decimal point and an arbitrary number of positions behind the decimal point. For the purpose of fuzzification (that is to say for the purpose of calculating the 12-bit membership value ye corresponding to the sharp 12-bit input variable xe), however, it is sufficient to store instead of sa data-compressed slope information (DKS) the derivation of which is to be explained with the aid of an example: that sa =

| 11 | 10 | 9 | 8 | 7 | 6 | 5 | 4 | 3 | 2 | 1 | 0 | –1 | –2 | –3 | –4 | –5 | –6 | –7 | –8 | –9 | –10 | –11 | –12 | –13 |
|---|---|---|---|---|---|---|---|---|---|---|---|---|---|---|---|---|---|---|---|---|---|---|---|---|
| 0 | 0 | 0 | 0 | 0 | 0 | 0 | 1 | 0 | 0 | 0 | 1 | 1 | 0 | 1 | 0 | 1 | 0 | 1 | 0 | 1 | 0 | 1 | 0 | 1 |

Here, the upper row specifies the bit position and the lower row the assigned values.

In a first step, it is now checked whether at least one of the bit positions in front of the decimal point has a value 1. If, as in the specified example, this is the case, as first part of the DKS the bit position p of the leading numeral 1 in front of the decimal point of sa is coded in a binary fashion; because of $0_{decimal} \leq p \leq 11_{decimal}$, four bits suffice for this purpose. It follows for the specified example that $$p = 4_{decimal} = 0100$$

The second part q of the DKS comprises a further 12 bits, which are obtained by rounding the bit positions immediately following the leading 1 in front of the decimal point of sa, to 12-bit accuracy; for the specified example, it is then necessary for this purpose to round the bit positions 3, 2, . . . , −9 with the values $$0001101010101,$$

to the value $$q = 000110101011.$$

As a result, a total of 16 bits (p(3), . . . , p(0), q(11), . . . , q(0)) are required for the purpose of coding the absolute value sa of a slope, if one of the bit positions in front of the decimal point of sa has the value 1, that is to say for sa ≥ 1.

The case of sa<1, that is to say all the bit positions in front of the decimal point of sa have the value 0 are coded in the following way:

For the first part p of the DKS, one of the still "free" bit combinations $$p(3) = p(2) = 1, p(1), p(0)$$

is arbitrarily chosen for p, while the second part q of the DKS is obtained by rounding the bit positions behind the decimal point of sa to 12-bit accuracy. If all the positions in front of the decimal point are set equal to zero in the example specified above, it holds initially that $$sa = 0 \; 0 \ldots 0, 1 \; 0 \; 1 \; 0 \; 1 \; 0 \; 1 \; 0 \; 1 \; 0 \; 1$$

and thus $$q = 1 \; 0 \; 1 \; 0 \; 1 \; 0 \; 1 \; 0 \; 1 \; 0 \; 1 \; 1$$

Thus, even in the case of s<1 a total of 16 bits are used for the purpose of coding sa.

The absolute value sa of the slope is then yielded from p and q in accordance with:

$$sa = \delta \cdot 2^p + 2^{\delta p - 12} \cdot \sum_{\sigma=11}^{0} s(\sigma + \delta \cdot p - 12) \cdot 2^\sigma,$$

where $\delta = 1 - p(3) \cdot p(2)$

It is now necessary to calculate the corresponding membership value ye for the input signals xe from the IMF shapes specified in FIGS. 5 and 6. It is expedient for this purpose to provide the following definitions:

vdx specifies the sign bit of dx. dx is the difference of xe−xs, that is to say the difference between the input signal xe and the x-value of the restart point inside the elementary interval which was hit by the input signal xe. This difference can be ≥0 or <0, depending on whether xe is situated to the right or to the left of the x-value of the restart point. It thus holds that:

$$vdx = 0 \text{ for } xe - xs \geq 0$$

$$vdx = 1 \text{ for } xe - xs < 0$$

The absolute value of the difference xe−xs is denoted by dxa. It holds that:

$$dxa = |xe - xs|$$

The sign bit for the value dy is denoted by vdy. In this case, dy is the product of the slope and xe−xs, and corresponds to ye−ys. vdy is then yielded from vdx as well as the sign bits vsr, vsl, implicitly contained in the type numbers t, of the slopes to the right and, respectively to the left of the restart point. It can be taken from the following table:

TABLE 1

| vdy | = | '0' | for | t(2) | = | '0' |
|---|---|---|---|---|---|---|
| vdy | = | vdx | for | t | = | "100" |
| vdy | = | '1' | for | t | = | "101" |
| vdy | = | '0' | for | t | = | "110" |
| vdy | = | v̄d̄x̄ | for | t | = | "111" |

These definitions yield the following formula for the membership value ye:

$$ye = ys \oplus (-1)^{vdy} \cdot (sa \otimes dxa)$$

ys is here the y-value of the restart point STS, vdy is the sign of dy, sa is the absolute value of the slope, and dxa is the absolute value of the difference dx.

It must be borne in mind that the values which ye can assume, that is to say also the product of sa and dxa and the sum of ys and this product are limited by the resolution of the membership value ye. ye thus has the limits 0 and, assuming that the signal ye is resolved with m bits, the second limit $2^{m-1}$. If it emerges from a calculation that either it must be that ye=0 or the lower limit 0 is undershot or the upper limit $2^{m-1}$ is overshot, it is no longer necessary to calculate precisely in accordance with the given formula. This limitation is specified in the formula for ye by ⊛ in the case of the product and by ⊕ in the case of the sum.

Figure 8:
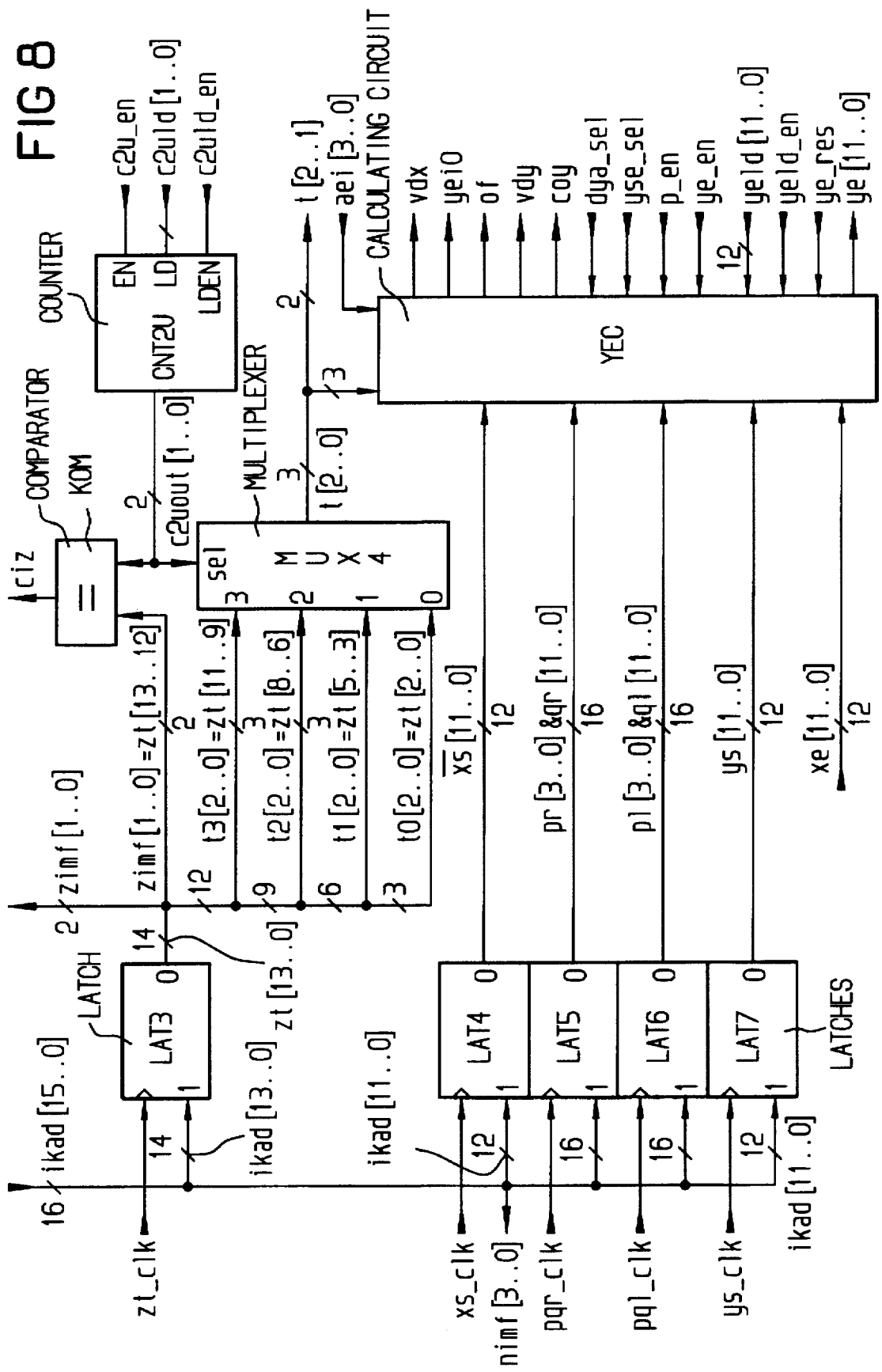
FIG. 8 is a block diagram which shows a general view of a fuzzifier circuit.
Figure 9:
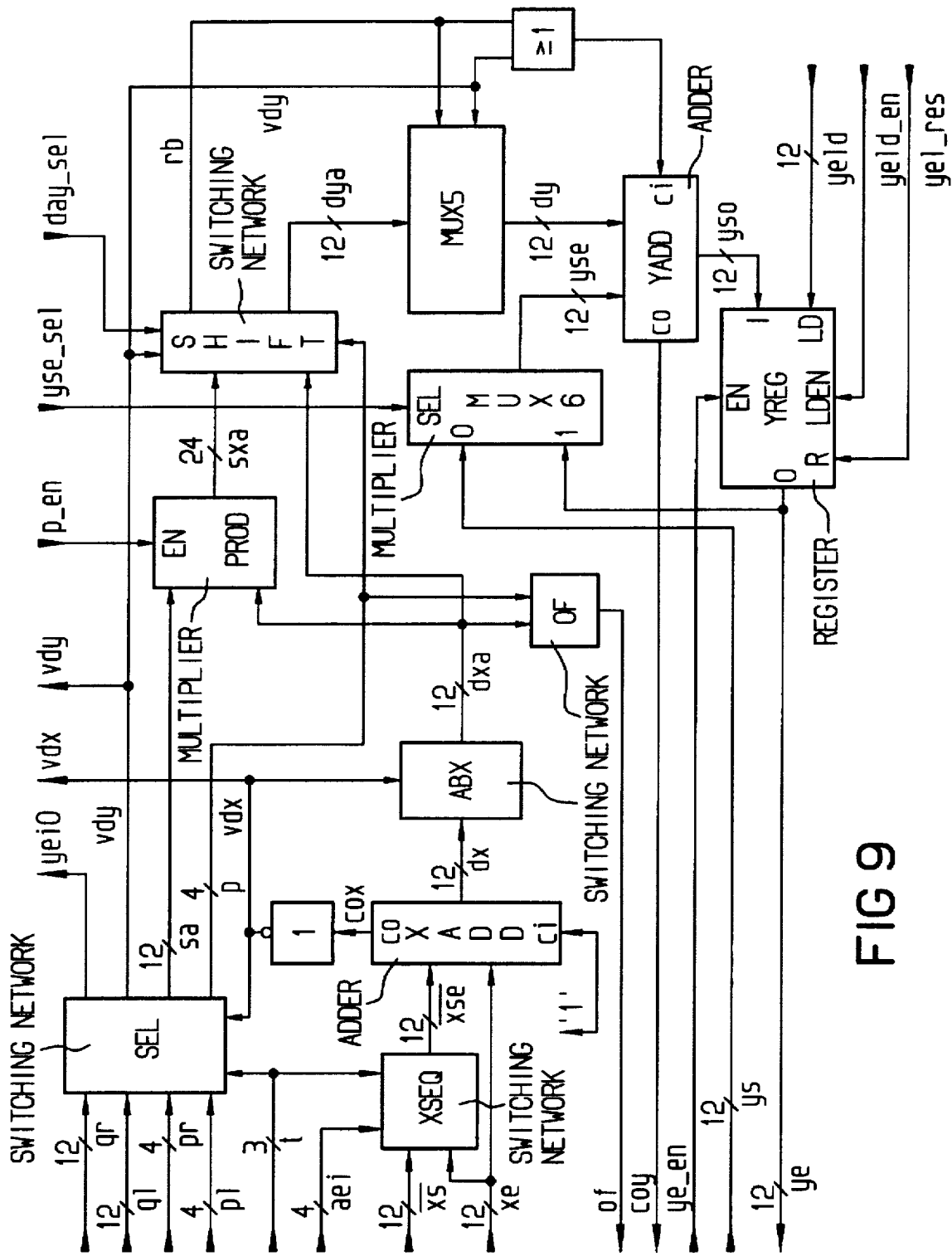
FIG. 9 is a block diagram which shows a calculating circuit of the fuzzifier circuit.

A fuzzifier circuit FUZ by means of which ye can be calculated, follows from FIG. 8 and FIG. 9. In this case, FIG. 8 shows the circuit, in which the calculating circuit YEC is represented only as a block; FIG. 9 shows the design of the calculating circuit YEC.

ye can be calculated as soon as the data of the membership functions hit are read out from the memory KBM and written into latch memories LAT3 to LAT7. In this arrangement, the latch memory LAT3 has written into it the first memory word SW0 of the memory sector which is assigned to the elementary interval and in which the number of the membership functions hit and their type numbers are contained. The 12 least significant bits of the memory word SW1 in which the number of the membership function and the bitwise inverted xs value are contained are written into the latch memory LAT4, while pr and qr are written into the latch memory LAT5, p1 and q1 are written into the latch memory LAT6, and ys is written into the latch memory LAT7. pr and qr, p1 and q1 and ys are respectively dedicated memory words SW which are stored in the memory KBM.

Via a multiplexer MUX4, the type numbers t contained in the first memory word SW0 are sequentially filtered out and fed to the calculating circuit YEC. In order to drive the multiplexer MUX4, provision is made in this case of a counter CNT2U which is incremented up to a value which corresponds to the number zimf which specifies the number of the membership functions for the elementary interval hit. This number zimf is likewise contained in the first memory word SW0. It is then possible to use the type numbers t, the values in the further memory words which are fed from the latch memories LAT4 to LAT6 to the calculating circuit YEC, and the input signal xe, which is likewise present at the calculating circuit YEC, so that the latter can calculate the membership value ye in accordance with the formula specified above. Once all the membership functions and their type numbers t have been processed for the elementary interval EI hit, a comparator circuit KOM, which compares the number zimf with the counter content of CNT2U, outputs a signal ciz which is fed to the controller STW and causes the latter to terminate the calculation of the membership values. The type number t, specifically its positions 1 and 2, is likewise fed to the controller, since these are significant for the course of the calculation of ye. The value of nimf goes to the inference unit FIN and is also used there to evaluate ye.

The more precise design of the calculating circuit can be gathered from FIG. 9. The difference dx is computed with the aid of the switching network XSEQ and the adder circuit XADD. The following transformation is used in this case to simplify the computation dx=L:

$$dx = xe - xs = xe + \overline{xse} + 1 \cdot 2^0$$

where $-xs = \overline{xse} + 1 \cdot 2^0$, an $\overline{xse}$ is the one's complement of xs. This corresponds to a two's complement notation for $-xs$.

Consequently, the switching network XSEQ is fed $\overline{xs}$, xe, aei and t, and $\overline{xse}$ is formed. aei and t are fed to the switching network XSEQ, in order to be able to calculate $\overline{xse}$ if it is not necessary to store the value of $\overline{xs}$ in the memory words, that is to say if, as is partly the case in, for example, FIG. 5, the x-coordinate xs of the restart point coincides with one of the interval boundaries.

The adder XADD is connected as a subtractor (CI='1') and forms the value dx from $\overline{xse}$ and xe. Furthermore, it generates the sign bit vdx, which is yielded from the inverted carry signal cox. Here, cox='1' for xe−xs≧0 and cox='0' for xe−xs<0.

Figure 12:
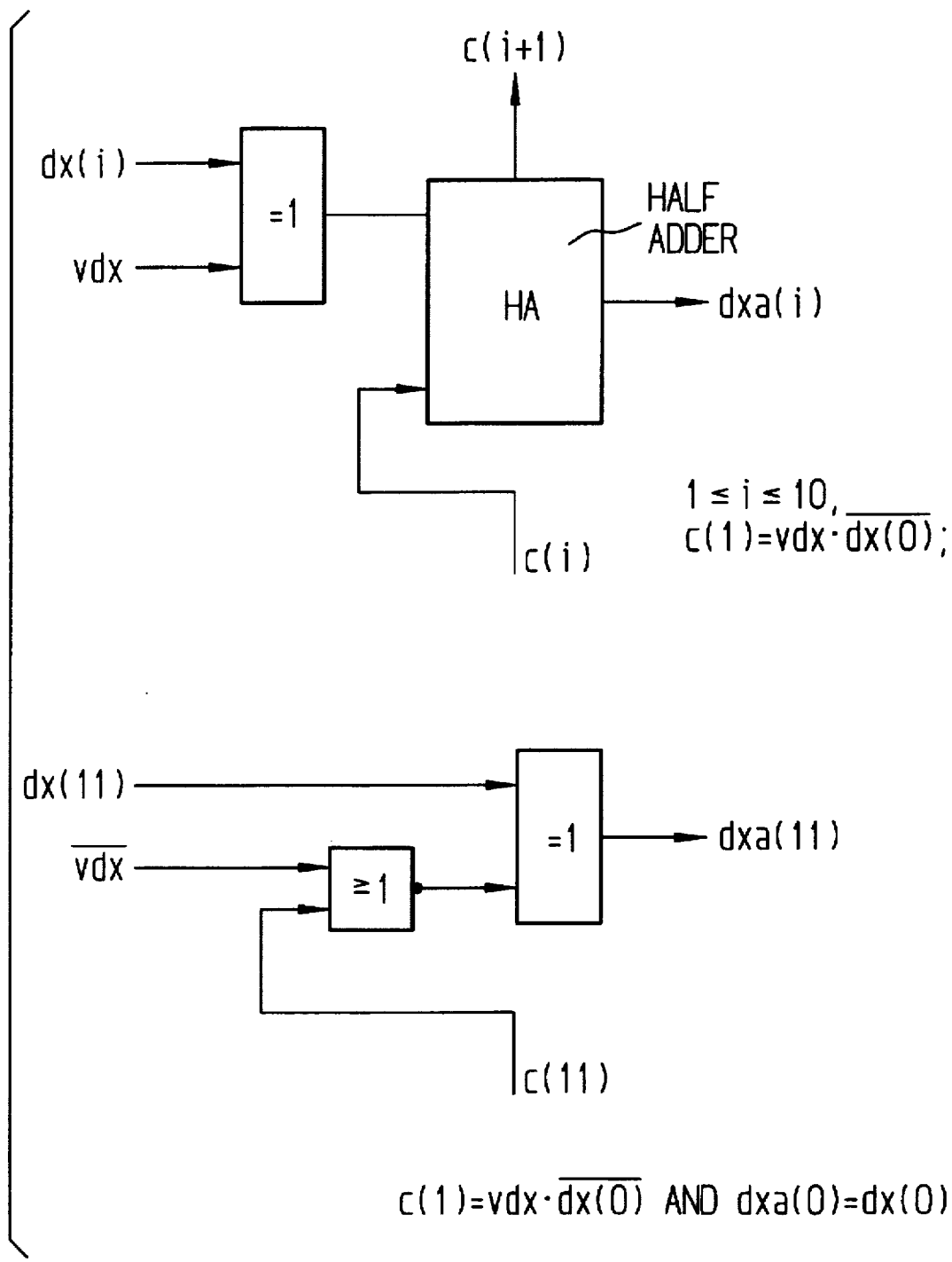
FIG. 12 is a block diagram which shows a circuit arrangement for forming an absolute value.
Figure 13:
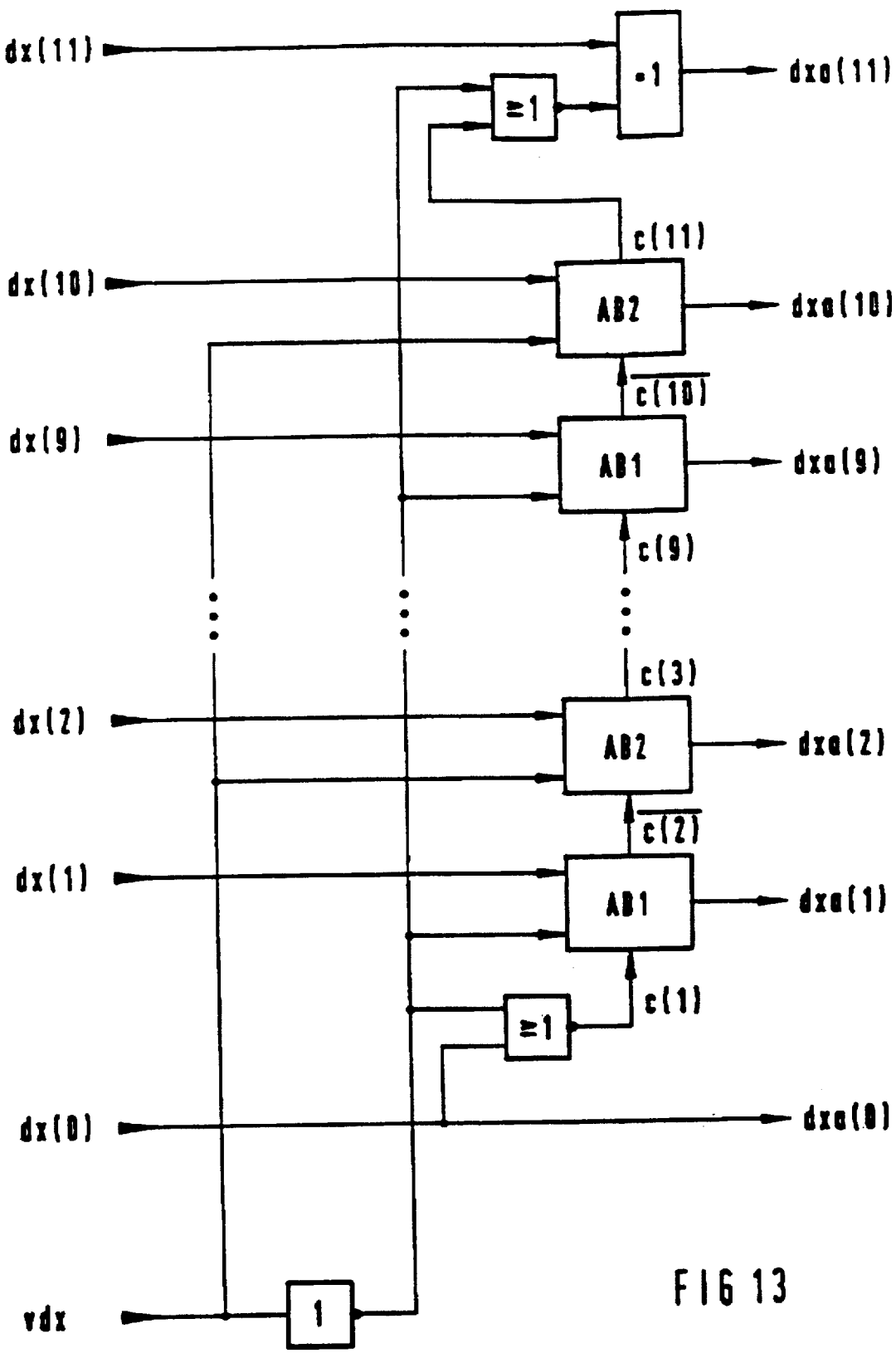
FIG. 13 is a block diagram which shows a further circuit arrangement for forming an absolute value.
Figure 14:
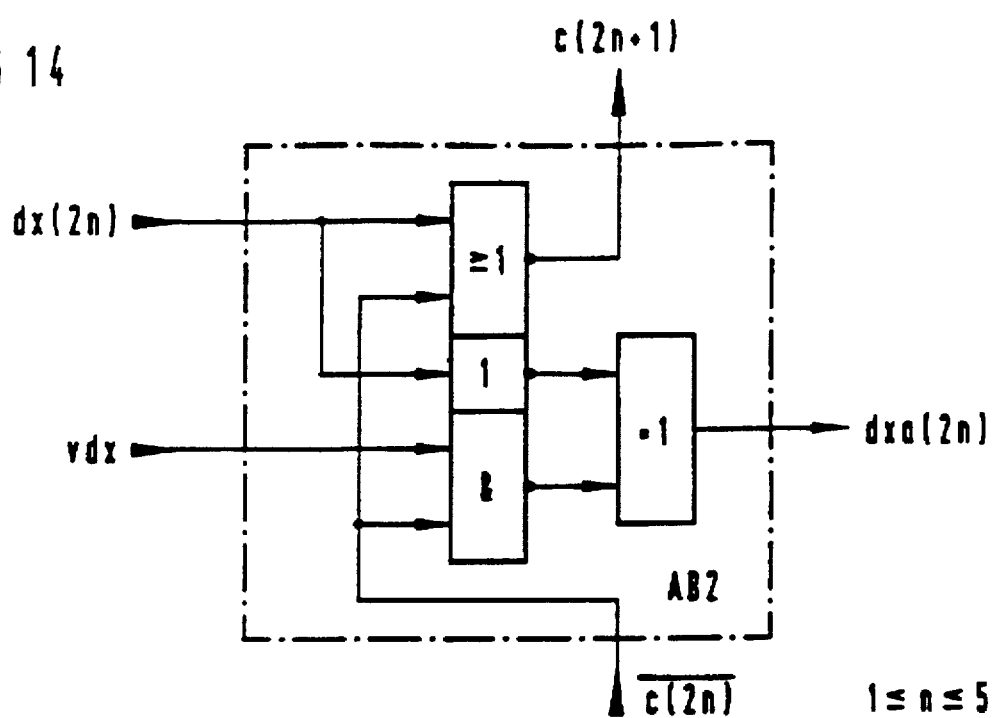
FIGS. 14 and 15 are block diagram which show components of the circuit arrangement according to FIG. 13.
Figure 15:
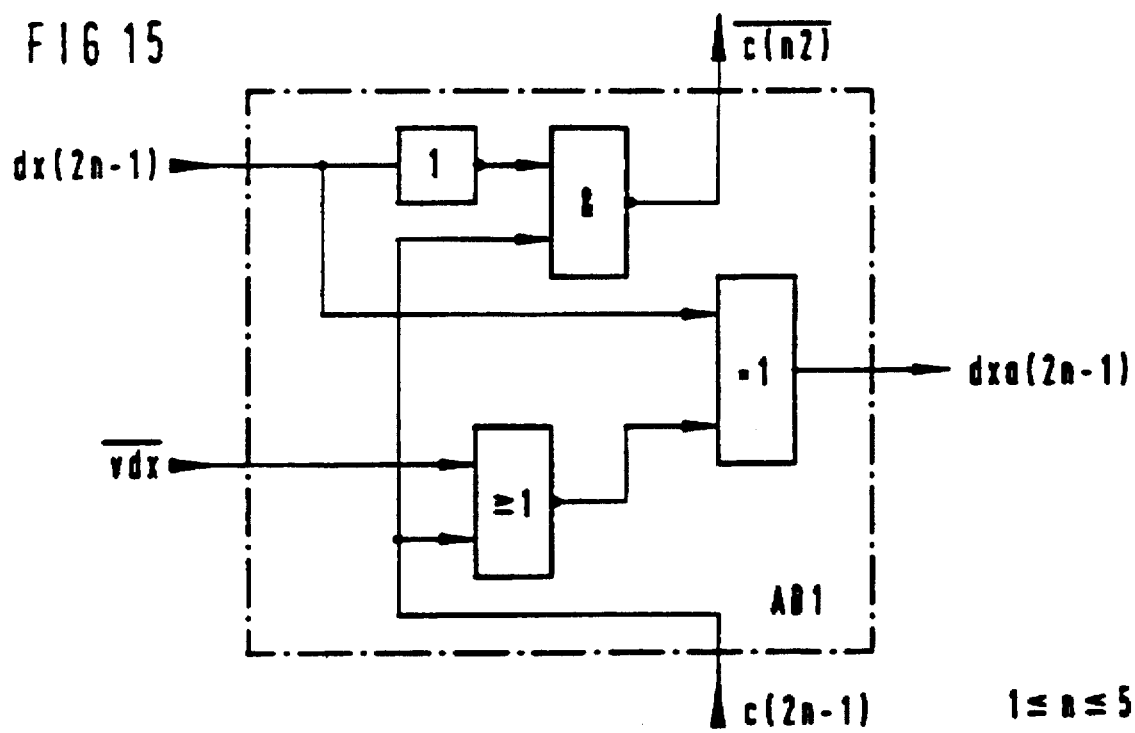

The switching network ABX now forms the absolute value of dx from dx. A circuit by means of which this can be carried out is shown in FIG. 12, in which the switching network ABX is implemented with the aid of half-adders HA, and in FIGS. 13 to 15. The function of these circuits can be gathered from the figures.

The output signal dxa of ABX is applied to one of two inputs of a multiplier PROD. Present at the second input of the latter are the 12 least significant bits of sa, of the respective absolute value of the slope s, which is supplied by the switching network SEL. It is selected from qr or q1. The switching network SEL continues to select p from pr or p1, and generates the sign of y, vdy by using the type number t, and of vdx in accordance with Table 1. It continues to generate a signal yei0, which specifies whether the membership value is already known, which can be gathered, for example, from the value of xe and the type number t. For example, it holds for t="000" and xe<xs or t−"001" and xe>xs, that ye=0. Specifically, it is then unnecessary to calculate the membership value, that is to say the fuzzifier circuit can start to calculate the membership value for the next membership function, or the inference unit can start to work if all the membership functions per elementary interval have been processed.

The switching network SHIFT carries out two tasks: firstly, the multiplication of dxa by $2^p$ is carried out with the aid of a control signal dya_sel='1' and, secondly, for dya_sel='0' the result sxa of the multiplier PROD is shifted to the correct position by using p. The calculation of dxa·$2^p$ can be carried out very quickly. The mode of operation of SHIFT is shown in Tables 2 and 3 as a function of the control signal dya_sel.

TABLE 2

| p | dya[11..0] |
|---|---|
| 0 | $\overline{dya\_sel}$ · sxa[23..12] + dya_sel · dxa[11..0] |
| 1 | $\overline{dya\_sel}$ · sxa[22..11] + dya_sel · {dxa[10..0]& "0" } |
| 2 | $\overline{dya\_sel}$ · sxa[21..10] + dya_sel · {dxa[9..0]& "00" } |
| . | . |
| 11 | $\overline{dya\_sel}$ · sxa[12..1] + dya_sel · {dxa(0)& "00000000000"} |
| ≧12 | dya_sel · sxa[23..12] |

Table 2 has a column for p, a column for the output value dya; Table 3 has a column for p and a column for a rounding bit rb. It is assumed here that in each case 12-bit wide numbers dxa and sa are multiplied by one another and the result sxa is 24 bits wide. According to Table 2, for p=0, for example, in which case the leading '1' is situated directly in front of the decimal point, the positions 23 to 12 of the result sxa are output as dya, while for the case in which p=11 is the positions 12 to 1. It is thus to be seen how the product sxa has to be shifted in the switching network SHIFT in order to output the correct value of dya. The case in which p≧12 indicates that no leading '1' is present in front of the decimal point, since a leading '1' in front of the decimal point can occupy the bit positions 11.0. For the case in which dya sel=1, the multiplication of dxa is carried out using $2^p$, that is to say the result sxa of the multiplier is not used. It is sufficient for this purpose that dxa is shifted in the switching network SHIFT. dxa is consequently fed to the switching network SHIFT. The extent of the displacement can likewise be gathered from Table 2. For the case in which p=0, no displacement at all takes place, while for the case in which p=1 dxa is shifted by one position to the left, that is to say the positions 0 to 10 of dxa are used and supplemented by a zero, while for the case in which p=11 only the zeroth position of dxa is used and the remaining positions are supplemented by zeros.

It is specified in Table 3 whether rounding must be performed. This is the case only if sxa is evaluated. It is to be seen which positions of sxa are used for the rounding. The rounding bit rb is yielded from the positions after the decimal point of the product sxa shifted to the correct position by means of SHIFT. rb is taken into account for positive dy, that is to say for vdy='0' MUX5 supplies dy=dya, when determining ye0 in YADD, since in this case it is necessary to round off for rb='1'. By contrast, for vdy='1' it is necessary to carry out a subtraction in YADD, that is to say the carry input ci=vdy+rb is given the value '1' irrespective of rb. The rounding required for rb='1' is therefore undertaken, together with the determination of dy, in MUX5, that is to say for vdy='1' MUX5 delivers:

$$dy(0) = \overline{rb} \cdot \overline{day\,(0)} + rb \cdot dya(0)$$

$$dy(1) = \overline{rb} \cdot \overline{dya(0)} \cdot \overline{dya\,(1)} + rb \cdot dya(0) \cdot dya(1)$$

.
.
.

$$dy(11) = \overline{rb} \cdot \overline{dya(0)} \cdot \overline{dya(1)} \cdot \ldots \cdot \overline{dya(10)} \cdot \overline{dya(10)} \cdot \overline{dya(11)} +$$
$$+ rb \cdot dya(0) \cdot dya(1) \cdot \ldots \cdot dya(10) \cdot dya(11)$$

TABLE 3

| p | rb |
|---|---|
| 0 | $\overline{dya\_sel} \cdot sxa(11) \cdot [\overline{vdy} + sxa(10) + sxa(9)+ \ldots +sxa(0)]$ |
| 1 | $\overline{dya\_sel} \cdot sxa(10) \cdot [\overline{vdy} + sxa(9) + sxa(8)+ \ldots +sxa(0)]$ |
| 2 | $\overline{dya\_sel} \cdot sxa(9) \cdot [\overline{vdy} + sxa(8) + sxa(7)+ \ldots +sxa(0)]$ |
| . | . |
| . |   |
| . |   |
| 11 | $\overline{dya\_sel} \cdot sxa(0)$ |
| ≧12 | $\overline{dya\_sel} \cdot sxa(11) \cdot [\overline{vdy} + sxa(10) + sxa(9)+ \ldots +sxa(0)]$ |

The switching network OF, to which dxa and p are fed, generates a signal of when an overflow occurs when multiplying dxa by $2^p$. It is demonstrated in this way that the membership value is already known and there is no need to wait for the result of the multiplier. It holds that:

$$ye=0 \text{ for } of='1' \text{ and } vdy='1'$$
$$ye=2^{12-1} \text{ for } of='1' \text{ and } vdy='0'$$

In a first step, the further adder YADD adds or subtracts the result of the multiplication of dxa by $2^p$ to the value of ys switched through with the control signal yse_sel. A multiplier MUX6 is used for this purpose. As soon as the result of this operation is buffered in a register YREG for ye, it is processed using yse_sel at the input yse value of dya, which is produced by shifting sxa in accordance with Table 2, to produce the final result ye0 and is stored in the register YREG, unless an overflow from vdy and the carry bit coy is determined by the adder YADD, in which case the membership value is fixed as follows:

$$ye = 0 \text{ for } \overline{vdy} \cdot \overline{coy} = '1'$$
$$ye = 2^{12-1} \text{ for } \overline{vdy} \cdot coy = '1'$$

Figure 10:
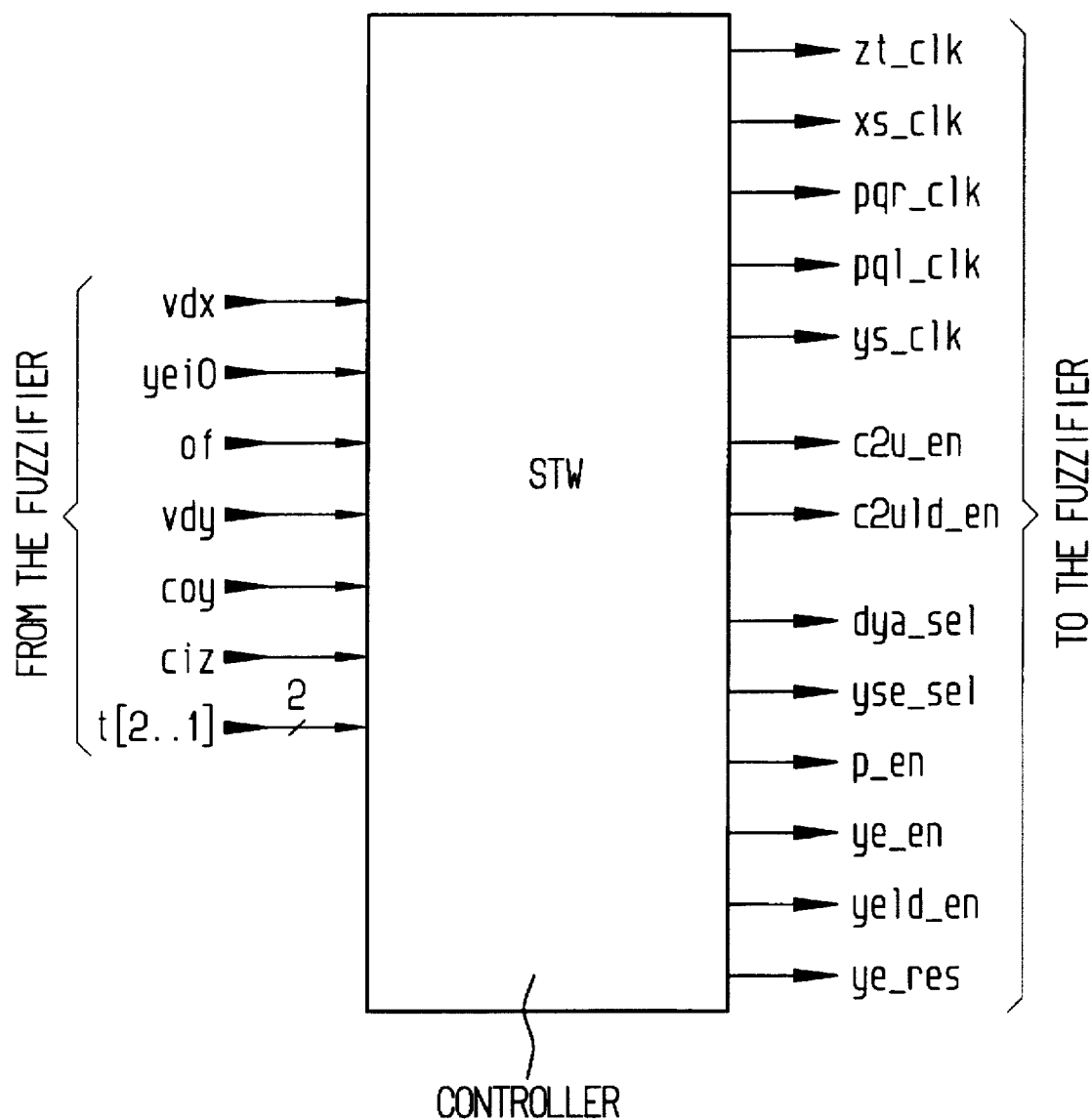
FIG. 10 is a block diagram which shows the signals required during operation of the fuzzifier circuit, generated by a controller.

The control signals and states necessary for the temporal sequence of the calculation of the membership value ye can be followed with the aid of a state graph (FIG. 11) for the controller STW (FIG. 10). The controller is implemented in this case as a switching network or finite state machine. The states wfp0, wfp1 and wfp2 correspond to clock pulses which are required for multiplying two numbers in the multiplier PROD. It is assumed in this case that for reasons of saving power and space, three clock pulses are required for multiplying two 12-bit numbers.

The start address of the memory sector IMFD is read out from the memory KBM with the state rdeia (read EIA). The first memory word SW0, corresponding to this start address, in IMFD is read out with the state rdzt. The first memory word SW0 contains the number zimf of the membership functions hit per elementary interval as well as the type numbers thereof. The counter CNT2U is loaded, and the register YREG for ye is reset.

In the state rdnxy (read x or y), the first word SW1 of the memory sector which contains the IMF data is read out, specifically nimf and $\overline{xs}$ or ys, and written into the latch memories LAT4 or LAT7. The counter CNT2U is counted further on one unit, in order to extract the type number from the memory word SW0.

The state rdnxy can also have been reached in the course of calculating preceding IMF values starting from rdpq1 or wfa or wfp1.

In the next state rdpq1, the second word SW2 is read out from the memory sector for the IMF data in which p1 and q1 or pr and qr are present. These are written into the latch memories 5 and 6.

In the state wfa, a membership value, calculated in rdpq1, of the preceding membership function is relayed to the inference unit FIN. At the same time, for the following state the relaying of an already known value ye of the current membership function is prepared, and the status bits of the multiplier pa1 and pa2 are reset. Either rdnxy or rdkbd2 is selected as the next state, depending on the value of the signal ciz.

The addition of $2^p \cdot dxa$ and ys is carried out in the state wfp0, and the result is stored in the register YREG.

In the state rdqp2, the third word SW3 of the memory sector of IMF data with p1 and q1 is read out and written into the latch memory LAT6.

In the state rdy, the fourth word SW4 of the memory sector, that is to say ys, is read out and written into the latch memory LAT7.

Figure 11:
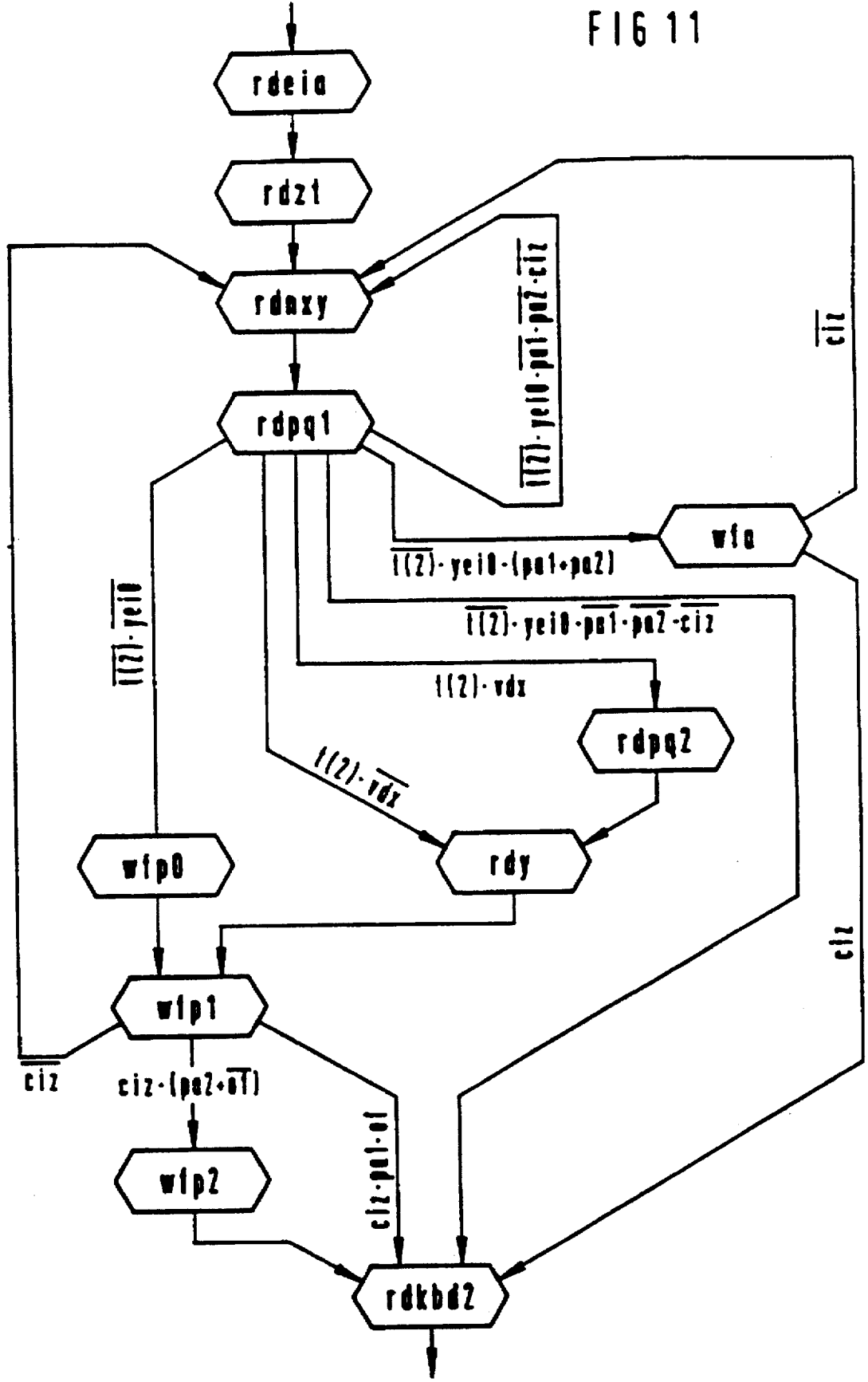
FIG. 11 is a state graph which describes the part of the controller relevant to the fuzzification.

In the state wfp1, the actions and the next states depend on the previous history, as is also shown by FIG. 11. If wfp1 was reached starting from wfp0, the multiplier PROD continues to be active, of the addition of $2^p$ dxa and ys does not cause an overflow (this is shown by of). If wfp1 was reached starting from rdy, the multiplier PROD is likewise active and the addition of $2^p \cdot dxa$ and ys is carried out and the result is stored in YREG. The state rdnxy for ciz=0 can follow wfp1 if still further IMF data are to be evaluated, or the state rdkbd2, with which the value ye is relayed to the unit FIN, or the state wfp2, which is treated below.

The multiplier PROD remains active in the state wfp2. Its result sxa is valid at the start of the next state rdkbd2 and can then be further processed to produce the final result ye.

In the state rdkbd2, the result xsa and the intermediate result stored in YREG are further processed to form the end result ye and relayed to the unit FIN. If rdkbd2 was reached starting from rdbq1, wfa or wfp1, the already known membership value ye of the last membership function is relayed to FIN.

The explanation of FIG. 11 was limited to the essential states of the controller. How the individual states operate can be detected from the data on the transitions between the states by using the explanation of the fuzzifier circuit. In this case, the signals pa1 and pa2 are status signals for the multiplier PROD, and the word read is abbreviated with rd. The value '1' of the signals pa1 or pa2 (pa corresponds to prod active) indicate that the multiplier PROD was activated in the respectively preceding state or was still active. In addition, pa1='1' indicates that PROD was activated in the state wfp0, and pa2='1' indicates that PROD was active in the state rdy.

Although other modifications and changes may be suggested by those skilled in the art, it is the intention of the inventors to embody within the patent warranted hereon all changes and modifications as reasonably and properly come within the scope of their contribution to the art.

I claim:

1. A method for storing input membership functions and for fuzzifying digital input signals present at the inputs of a fuzzy processor by using these input membership functions, comprising the steps of:
   a) storing each membership function using shape information respectively containing a shape of the membership function,
   b) dividing a basic range of an input signal, resolved with ae bits, of each input into elementary intervals,
   c) the shape information of a membership function containing per elementary interval respective values of restart points, at which one of a slope of the membership function changes inside the elementary interval or the membership function intersects boundaries of the elementary interval, and contains the slopes of the membership function which start from the restart points and extend in the elementary interval, d) performing said dividing step of the basic range into elementary intervals in accordance with a division condition that each membership function inside an elementary interval has precisely one restart point, e) determining, which of the membership functions present in the elementary interval are hit by an input signal, and f) determining a membership value of the input signal for each membership function hit, g) subdividing the basic range into intervals of equal size until at least one of the intervals fulfills the division condition, said one interval then remaining unchanged and forming an elementary interval of a first stage, h) further subdividing the intervals which do not fulfill the division condition as a second stage after the first subdivision independently of one another until at least one of said intervals of the second stage fulfills the division condition, said at least one interval of said second stage then remaining unchanged and forming an elementary interval of the second stage, i) further subdividing the intervals which do not fulfill the division condition after a preceding subdivision until the intervals produced in the further subdividing steps fulfill the division condition, the intervals which satisfy the division condition respectively remaining unchanged and forming an elementary interval of a higher stage.

2. A method as claimed in claim 1, further comprising the step of: storing the shape information of the membership function per input in a memory and addressing the shape memory in the following way:

a) storing in a first memory word a first address with which a second memory word can be addressed in which a number of intervals of the first stage is stored in a coded fashion, b) addressing with aid of content of the second memory word and the most significant bits of the input signal a third memory word in which at least one position specifies whether an interval of the first stage fixed by the most significant bits of the input signal is an elementary interval, ba) in this case, taking the start address of the memory sector from further positions of the third memory word by storing the shape information of the membership functions of the elementary interval hit, bb) otherwise using the most significant bits of the input signal to address a further memory word in which at least one position specifies whether an interval, hit by the most significant bit, of the second stage is an elementary interval, and in this case taking from further positions of the further memory word a start address of that memory sector in which the shape information of the membership functions of the elementary interval hit is stored, otherwise the procedure is continued as in bb) until it can be detected from the further addressed memory words that the interval hit by the most significant bit is an elementary interval and the assigned memory sector is found.

3. A method for storing input membership functions and for fuzzifying digital input signals present at the inputs of a fuzzy processor by using these input membership functions, comprising the steps of:

a) storing each membership function using shape information respectively containing a shape of the membership function, b) dividing a basic range of an input signal, resolved with ae bits, of each input into elementary intervals, c) the shape information of a membership function containing per elementary interval respective values of restart points at which one of a slope of the membership function changes inside the elementary interval or the membership function intersects boundaries of the elementary interval, and contains the slopes of the membership function which start from the restart points and extend in the elementary intervals, d) performing said dividing step of the basic range into elementary intervals in accordance with a division condition that each membership function inside an elementary interval has precisely one restart point, e) determining which of the membership functions present in the elementary interval are hit by an input signal, and f) determining a membership value of the input signal for each membership function hit, the elementary intervals being of equal size, the number of elementary intervals being a power of 2, and an exponent of said power of 2 being aei most significant bits of the input signal fixing the basic range.

4. A method for storing input membership functions and for fuzzifying digital input signal, present at the inputs of a fuzzy processor by using these input membership functions, comprising the steps of:

a) storing each membership function using shape information respectively containing a shape of the membership function, b) dividing a basic range of an input signal, resolved with ae bits, of each input into elementary intervals, c) the shape information of a membership function containing per elementary interval respective values of restart points, at which one of a slope of the membership function chances inside the elementary interval or the membership function intersects boundaries of the elementary interval, and contains the slopes of the membership function which start from the restart points and extend in the elementary interval, d) performing said dividing step of the basic range into elementary intervals in accordance with a division condition that each membership function inside an elementary interval has precisely one restart point, e) determining which of the membership functions present in the elementary interval are hit by an input signal, and f) determining a membership value of the input signal for each membership function hit, wherein the stored shape information contains for each membership function a number, restart point values and slope information, the slope information comprises first and second parts, in which the first part specifies one of: a bit position of a leading '1' in front of a decimal point of an absolute value of a slope sa, and that all positions in front of the decimal point are '0', and the second part being obtained from a bit following the leading '1' in front of the decimal point and, if there is no leading '1' in front of the decimal point, being determined from positions after the decimal point of the absolute value.

5. A method for storing input membership functions and for fuzzifying digital input signals present at the inputs of a fuzzy processor by using these input membership functions, comprising the steps of:
   a) storing each membership function using shape information respectively containing a shape of the membership function,
   b) dividing a basic range of an input signal, resolved with ae bits, of each input into elementary intervals,
   c) the shape information of a membership function containing per elementary interval respective values of restart points, at which one of a slope of the membership function changes inside the elementary interval or the membership function intersects boundaries of the elementary interval, and contains the slopes of the membership function which start from the restart points and extend in the elementary interval,
   d) performing said dividing step of the basic range into elementary intervals in accordance with a division condition that each membership function inside an elementary interval has precisely one restart point,
   e) determining which of the membership functions present in the elementary interval are hit by an input signal, and
   f) determining a membership value of the input signal for each membership function hit,
wherein the stored shape information contains for each membership function a number, restart point values and slope information, and
   assigning different shapes of the membership functions a type number, one bit of the type number specifies whether inside the elementary interval a partial curve of the membership function which starts from the restart point has only one slope or two different slopes, and two further bits of the type number specify a sign of the slopes.

6. A method as claimed in claim 5, further comprising the step of: storing the shape information of the membership function per input in a memory and addressed in the following way:
   storing in a first memory word a first address with which to address a second memory word in which a number of elementary intervals per input for all the inputs is stored in a coded fashion, and
   storing for each elementary interval a third memory word per input in which a start address of that memory sector is contained which contains the shape information of the membership functions per elementary interval and input, and said third memory word being addressed by combining aei most significant bits of the input signal and number.

7. A method as claimed in claim 6, wherein the memory sector for the membership functions for each elementary interval contains the following information:
   storing in a first memory word, the number of the membership functions per elementary interval and the type numbers of the membership functions in this elementary interval, and
   storing the numbers of the membership functions, the restart point values and the slope information in further memory words.

8. A circuit arrangement for carrying out the fuzzification of input signals comprising:
   a knowledge base memory,
   a bus connected to said knowledge base memory,
   a latch memory connected to said bus for storing a first memory word, read out from the knowledge base memory, of a sector for membership functions,
   a multiplexer connected downstream of the latch memory which selects a type number from the first memory word,
   a counter whose output is connected to a control input of the multiplexer and
   a comparator circuit having a second input connected to said latch memory to receive a number of membership functions per elementary interval,
   further latch memories connected to the bus each for buffering values $\overline{xs}$, vs, p, and q, and
   a calculating circuit for calculating the membership value according to the formula $$ye = ys + (-1)vdy \cdot (sa \cdot dxa)$$

in which it holds that:
   ys=restart point value in y-direction,
   sa=absolute value of slope,
   dxa=absolute value of difference dx=xe−xs
   xe=input value,
   xs=restart point value in x-direction, and
   vdy=sign of difference ye−ys
wherein the calculating circuit has the following circuits:
   a first switching network for forming dx,
   a second switching network for forming dxa, which is connected to the first switching network,
   a multiplier for generating the product sxa from sa and dxa, and
   an adder for adding sxa to ys to form the result ye.

9. A circuit arrangement as claimed in claim 8, further comprising:
   a third switching network connected downstream of a multiplier which shifts sxa in accordance with p to a correct position, and
   a fifth multiplexer which applies the shifted sxa as dy to the adder.

10. A circuit arrangement as claimed in claim 9, wherein the third switching network is operable to obtain a rounding bit from positions after a decimal point of the product sxa shifted to a correct position,
   said fifth multiplexer being operable to carry out rounding of dy as a function of vdy.

11. A circuit arrangement as claimed in claim 9, wherein the third switching network is operable to calculate a value of 2p·dxa and feed it to the adder via the fifth multiplexer, and further comprising:
   a register in which a result of the adder is buffered, and
   a multiplexer which applies an output of the register, on one hand, and the value ys, on another hand, to an input of the adder.

12. A circuit arrangement as claimed in claim 8, further comprising:
   a fourth switching network which combines p with dxa to determine whether an overflow is present.

13. A circuit arrangement as claimed in claim 8, wherein the first switching network has a circuit for forming a one's complement of xs and a second adder, which is connected as a subtractor and forms a difference dx=xe−xs from an input signal xe, a restart point value xs and a type number.

14. A circuit arrangement as claimed in claim 8, further comprising:
   a fifth switching network which is fed a type number, a sign of dx and a slope information p and q, and which outputs therefrom the sign vdy of dy, the slope sa, a value of p and a signal which indicates that a value of ye must be 0.

* * * * *